(12) United States Patent
Takahashi et al.

(10) Patent No.: US 7,705,562 B2
(45) Date of Patent: Apr. 27, 2010

(54) SWITCHING POWER SUPPLY UNIT AND DISK ARRAY SYSTEM

(75) Inventors: Fumikazu Takahashi, Hitachi (JP); Akihiko Kanouda, Hitachinaka (JP); Kuniyoshi Watanabe, Nakai (JP); Masahiro Hamaogi, Odawara (JP); Yoshihide Takahashi, Odawara (JP)

(73) Assignee: Hitachi Computer Peripherals Co., Ltd., Kanagawa-ken (JP)

( * ) Notice: Subject to any disclaimer, the term of this patent is extended or adjusted under 35 U.S.C. 154(b) by 260 days.

(21) Appl. No.: 11/512,111

(22) Filed: Aug. 30, 2006

(65) Prior Publication Data

US 2007/0047100 A1 Mar. 1, 2007

(30) Foreign Application Priority Data

Aug. 31, 2005 (JP) .............................. 2005-251768

(51) Int. Cl.
*H02J 7/00* (2006.01)
(52) U.S. Cl. ........................ 320/128; 320/166; 307/46; 307/64
(58) Field of Classification Search ................. 320/128, 320/166; 307/46, 63, 664
See application file for complete search history.

(56) References Cited

U.S. PATENT DOCUMENTS

| | | | | |
|---|---|---|---|---|
| 4,056,764 A | * | 11/1977 | Endo et al. .................. | 320/101 |
| 5,656,869 A | * | 8/1997 | Gluskoter et al. ............. | 307/64 |
| 6,204,574 B1 | * | 3/2001 | Chi .............................. | 307/66 |
| 6,787,936 B2 | * | 9/2004 | Nitta et al. ..................... | 307/64 |
| 6,879,132 B2 | | 4/2005 | Oki et al. | |
| 2003/0220026 A1 | * | 11/2003 | Oki et al. ..................... | 439/894 |
| 2005/0162018 A1 | * | 7/2005 | Realmuto et al. ............. | 307/44 |

FOREIGN PATENT DOCUMENTS

| | | |
|---|---|---|
| EP | 1355404 A1 * | 10/2003 |
| JP | 7-244563 A | 9/1995 |
| JP | 9-009525 A | 1/1997 |
| JP | 2002-051483 A | 2/2002 |
| JP | 2003-079069 A | 3/2003 |
| JP | 2004-007950 | 1/2004 |
| JP | 2004-159405 A | 6/2004 |

* cited by examiner

*Primary Examiner*—Edward Tso
*Assistant Examiner*—Samuel Berhanu
(74) *Attorney, Agent, or Firm*—Antonelli, Terry, Stout & Kraus, LLP.

(57) ABSTRACT

An object of the invention is to provide a small and low-cost switching power supply unit with a backup function in which a proper circuit construction can be selected by simple method when it is necessary to compensate for the instantaneous drop or power failure and a disk array system having the switching power supply unit. To accomplish the object, a backup unit which can insert and pull out its hot line into a switching power supply unit casing and has a secondary battery and its state monitoring/control unit is built in the unit, and proper charge/discharge management of the secondary battery can be made. When the backup unit is unnecessary, a backup unit formed by a plurality of capacitors whose hot lines can be similarly inserted and pulled out can be built in an enclosing space of the backup unit.

12 Claims, 18 Drawing Sheets

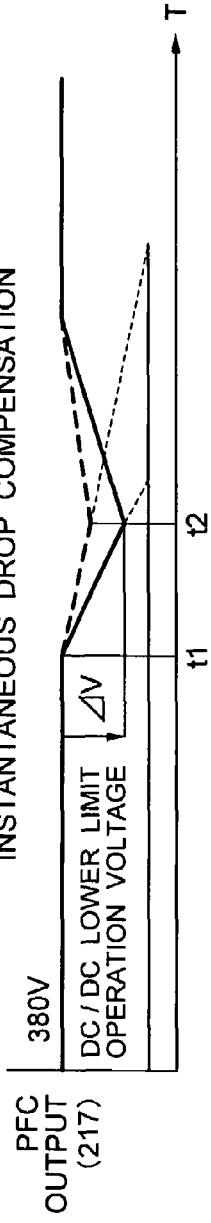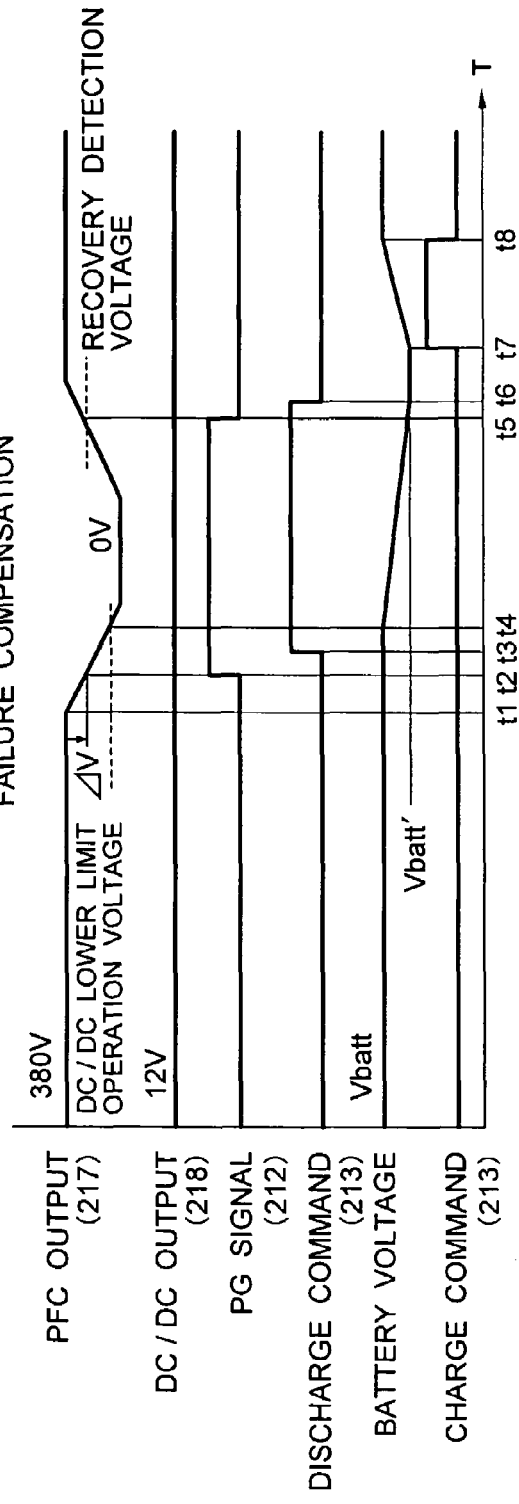

SWITCHING POWER SUPPLY UNIT AND DISK ARRAY SYSTEM

INCORPORATION BY REFERENCE

The present application claims priority from Japanese application JP 2005-251768 filed on Aug. 31, 2005, the content of which is hereby incorporated by reference into this application.

BACKGROUND OF THE INVENTION

1. Field of the Invention

The invention relates to a switching power supply unit for converting an AC (Alternating Current) electric power into a DC (Direct Current) electric power and supplying it to a load and a disk array system and, more particularly, to a switching power supply unit having a backup function and a disk array system.

2. Description of the Related Art

Very high reliability is required for a power supply unit of a network information apparatus such as server, router, or disk array system. Not only at the time of maintenance and inspection but also at the time of an abnormality of a commercially available power supply such as power failure, instantaneous voltage drop (hereinafter, referred to as an "instantaneous drop"), or the like, even an instantaneous halt of the power supply unit is not permitted and uninterruption and non-short-break are indispensable. Ordinarily, the improvement of the reliability of the power supply is realized by adding a UPS (uninterruptible power supply unit). However, there is such a problem that since the UPS is connected between a commercially available power supply and a power supply in the information apparatus, the number of converters in a range from the commercially available power supply to the load increases, the realization of high efficiency is obstructed, and it is difficult to insert and pull out a hot line at the time of maintenance and inspection. Since volumes of a lead acid battery and an inverter circuit as component elements of the UPS are large, miniaturization of a power supply unit is also obstructed.

To solve the above problem, a power supply system construction in which a backup power supply is connected in parallel to a DC line in the power supply is used. The backup power supply is constructed by: a secondary battery having a high energy density such as nickel hydrogen battery, lithium ion battery, or the like; and its charging/discharging circuit. In a connecting position, a package form, a circuit system, and the like of the backup power supply, various kinds of techniques have been proposed. For example, there is a technique disclosed in JP-A-2004-7950. According to such a technique, a third winding (N3) is newly provided as a backup winding for a transformer in a switching power supply, and a secondary battery and a discharging switch are connected to the third winding (N3). At the time of a power failure, charges accumulated in a battery are discharged and a DC/DC converter is stably operated, thereby realizing electric power consumption for a load. A charging route to the battery is separately provided and a proper charging is performed from an output of a rectifying/smoothing circuit through a charging circuit. A charge/discharge control circuit for making charge/discharge control and the battery are built in a same casing as that of the switching power supply, thereby realizing miniaturization of a battery pack and high efficiency upon discharging. In addition, by properly managing the charge/discharge to/from the battery, a stable electric power supply to the load thereby is realized even at the time of the power failure. Further, by using such a structure that the discharging switch, charging circuit, charge/discharge control circuit, and the like are installed on a same circuit board together with the DC/DC converter and the rectifying/smoothing circuit and only the battery can be taken out of the casing of the switching power supply, ease of maintenance and inspection of the battery is improved.

SUMMARY OF THE INVENTION

In the switching power supply unit having such a battery backup function, for the user who does not need the backup, since each circuit unit regarding the battery control as mentioned above is additionally installed, not only costs rise but also the miniaturization of the switching power supply unit is obstructed because a battery installation space is surplus. For the user who does not need the backup for a long time but wants to compensate only for the instantaneous drop of about tens of milliseconds (msec) to 1 second (sec), if the battery backup is performed, its capacity is excessive. If not only the charging/discharging circuits but also their control circuit is considered, there is a risk of a large increase in costs.

Although a frequency of occurrence of the power failure and that of the instantaneous drop differ depending on the region, season, or the like, the frequency of occurrence of the instantaneous drop is extremely larger on average. For the power supply, in many cases, higher importance is attached to which amount of electric power can be continuously supplied for the instantaneous drop (instantaneous drop withstanding ability).

It is an object of the invention to provide a small and low-cost switching power supply unit having a backup function which can select a proper circuit construction by simple method in accordance with the necessity for compensation for an instantaneous drop or a power failure.

It is another object of the invention to provide a disk array system having a small and low-cost switching power supply system with a backup function.

To accomplish the above objects, according to the invention, there is provided a switching power supply unit which has charge accumulating unit and can supply an electric power to a load in case of emergency, wherein: an electric power converting circuit and state monitoring and control unit having state monitoring unit of the charge accumulating unit and control unit for controlling the electric power converting circuit are connected to the charge accumulating unit; the electric power converting circuit is connected to a DC line in the switching power supply unit so that a charge and a discharge of the charge accumulating unit can be performed; and a backup unit having the charge accumulating unit and the state monitoring and control unit is detachably provided in a casing of the switching power supply unit.

To accomplish the above objects, according to the invention, there is provided a switching power supply unit which has charge accumulating unit and supplies an electric power to a load in case of emergency, wherein either a first backup unit having a secondary battery and state monitoring and control unit of the secondary battery or a second backup unit having a capacitor and state monitoring and control unit of the capacitor is detachably connected to a connector provided in a casing of the switching power supply unit.

To accomplish the above objects, according to the invention, there is provided a disk array system having a switching power supply unit which has charge accumulating unit and supplies an electric power to a load in case of emergency, wherein the switching power supply unit is arranged in a rack casing of the disk array system and the switching power supply unit can insert and pull out a hot line into/from the disk array system.

To accomplish the above objects, according to the invention, there is provided a disk array system which has charge accumulating unit and can supply an electric power to a load in case of emergency, wherein either a first backup unit having a secondary battery and state monitoring and control unit of the secondary battery or a second backup unit having a capacitor and state monitoring and control unit of the capacitor is detachably connected to a connector provided in a rack casing of the disk array system.

To accomplish the above objects, according to the invention, there is provided a switching power supply unit having a backup function, wherein: a first backup unit which can insert and pull out a hot line into/from a casing of the switching power supply unit and comprises a secondary battery and state monitoring and control unit of the secondary battery is built in the switching power supply unit and proper management of charge and discharge of the secondary battery can be made; when the first backup unit is unnecessary, a second backup unit which can insert and pull out the hot line in a manner similar to the case of the first backup unit and comprises a plurality of capacitors is built in an enclosing space for the first backup unit; both of the backup units can be easily exchangeably attached to a backup unit connecting connector which has previously been provided on a circuit board in the switching power supply unit; and further, both of the backup units can be connected to electrically different DC paths in the switching power supply unit through the connecting connector.

According to the invention, a small and low-cost switching power supply unit which can supply a stable DC electric power to a load at high reliability can be provided.

According to the invention, a disk array system having the high reliability can be realized.

Other objects, features and advantages of the invention will become apparent from the following description of the embodiments of the invention taken in conjunction with the accompanying drawings.

BRIEF DESCRIPTION OF THE DRAWINGS

FIGS. 4A and 4B show the operations of the embodiment in FIGS. 2A and 2B;

DESCRIPTION OF THE EMBODIMENTS

An embodiment of the invention will be described hereinbelow with reference to the drawings.

Figure 1:
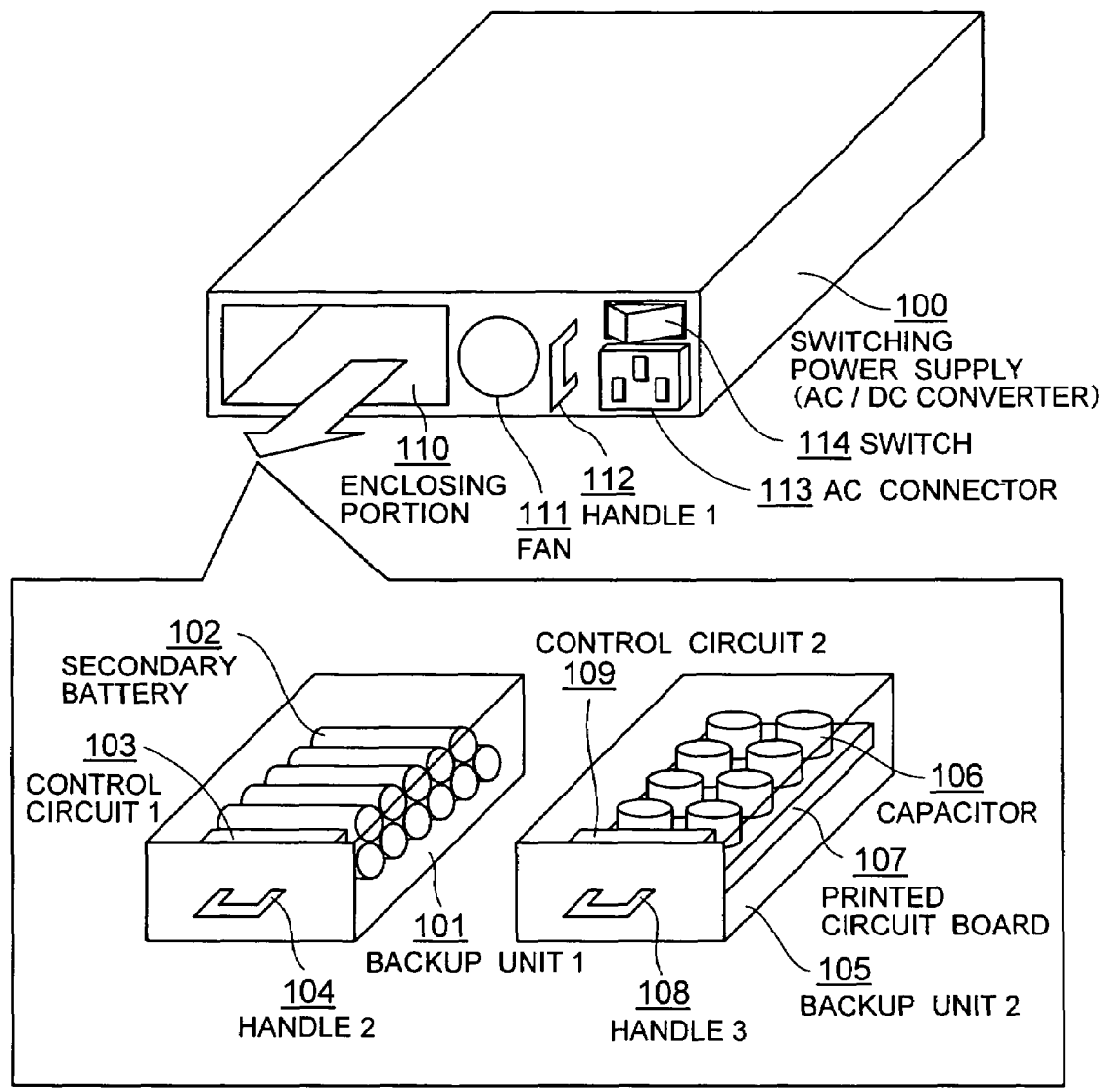
FIG. 1 shows an embodiment of the invention.

FIG. 1 shows an external view of a switching power supply 100 with a backup function as an embodiment of the invention. This power supply unit is constructed by an enclosing portion 110, a fan 111, a handle 1 (112), an AC connector 113, a switch 114, and the like. The fan cools not only a power semiconductor device installed in the switching power supply but also a backup unit, which will be explained hereinafter. A commercially available power supply and the AC connector are connected by a cable and the power supply is turned on/off by the switch. The switching power supply 100 has such a structure that a backup unit 1 (101) or a backup unit 2 (105) can be enclosed in the enclosing portion 110 and are detachably inserted into a casing of the switching power supply through a connector, a cable, or the like (not shown).

The backup unit 1 has a plurality of secondary battery cells 102 and is constructed by a control circuit 1 (103) and a handle 2 (104). Other parts such as connector, cable, switch, and the like are omitted. The backup unit 1 is an energy bank for power failure compensation using a secondary battery of high energy density. For example, a power failure compensation time is set to a time adapted to compensate for a few seconds to a few minutes. A plurality of secondary battery cells corresponding to a backup necessary capacity are connected serially or in parallel, thereby enabling a desired backup to be realized. Although not shown, a plurality of secondary battery cells are structured as a pack as necessary and sensing lines of a voltage and a temperature and a power line are led out of the pack by a cable and connected to the control circuit 1. For example, a nickel-metal hydrogen (NiMH) battery, a lithium (Li) battery, or the like can be used as a secondary battery. The control circuit 1 monitors states such as voltage, temperature, and the like of the secondary battery, thereby making proper charge/discharge management of the battery. Characteristics of the secondary battery change largely in dependence on an ambient temperature. Since a temperature in the casing also changes in dependence on an environment where the switching power supply is placed, by properly controlling a rotational speed of a fan equipped for the power supply, a charging/discharging efficiency of the battery is improved and a life of the battery can be prolonged. The backup unit 1 is constructed in such a manner that a hot line can be inserted and pulled out into/from the switching power supply 100 by a switch or the like (not shown) provided on the front side of the backup unit 1.

The backup unit 2 is formed by mounting a plurality of capacitors 106 onto a printed circuit board 107 and is constructed by other component elements such as control circuit 2 (109) and handle 3 (108). Other parts such as connector, cable, switch, and the like are omitted. The backup unit 2 is an energy bank for instantaneous drop compensation using a capacitor. For example, an instantaneous drop compensation time is set to a time adapted to compensate for tens of (msec) to about one second. A plurality of capacitors corresponding to the backup necessary capacity is connected in parallel or serially, thereby enabling a desired backup to be realized. For example, an aluminum electrolytic capacitor, an electric double layer capacitor (EDLC), or the like can be used as a capacitor. The control circuit 2 executes a process for suppressing a rush current as necessary, a process for balancing the voltages among the capacitors in the case where the capacitors are serially connected, or the like. According to the capacitors, the higher a using temperature is, the more its deterioration is accelerated. Therefore, by properly controlling the rotational speed of the fan equipped for the power supply, the using temperature is adjusted and the life of the battery can be prolonged.

The backup units 1 and 2 can be also constructed in such a manner that the casing portions are formed in common and the inner component elements such as connector, cable, energy bank, and the like can be exchanged. By forming the casing portions in common, low costs can be realized. The backup unit and the switching power supply can be connected by the connectors as mentioned above or can be also connected by a back board.

Figure 2A:
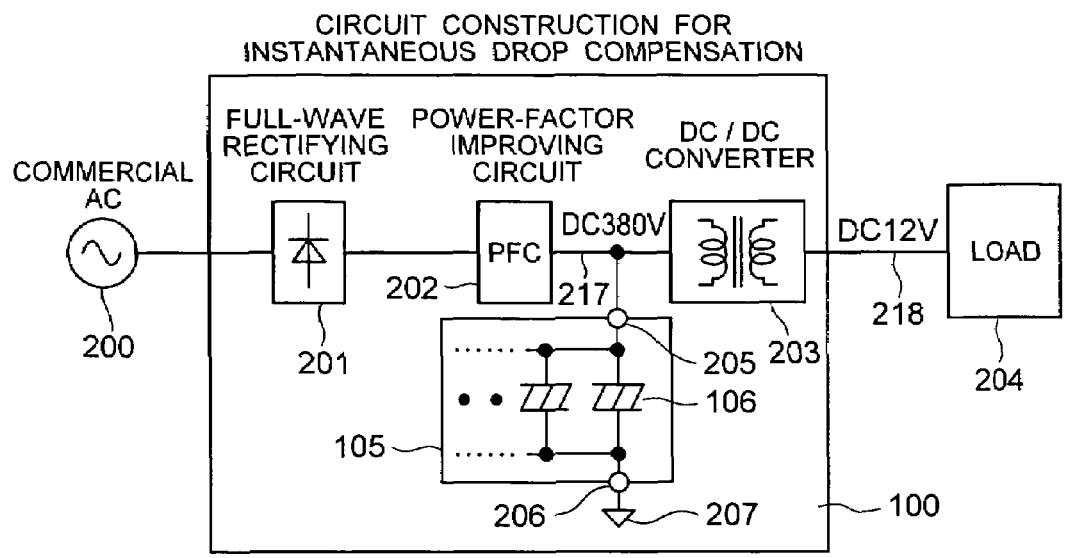
FIGS. 2A and 2B show circuit constructions of the invention.
Figure 2B:
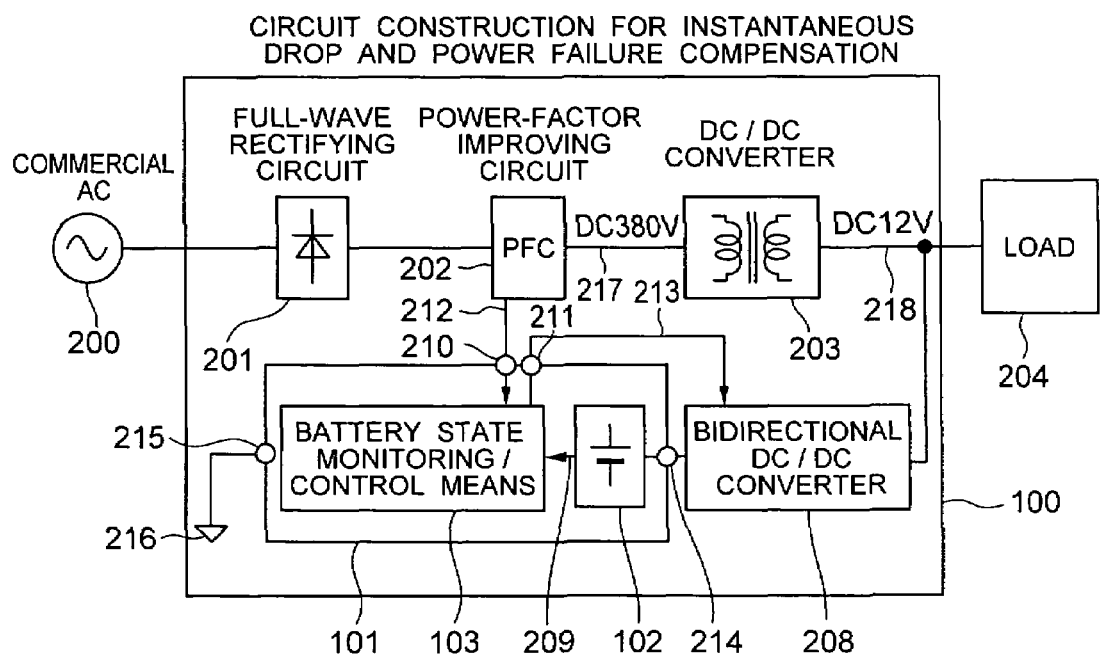

FIGS. 2A and 2B show circuit constructions in the case where each of the backup units has been mounted in FIG. 1. FIG. 2A is the circuit construction for the instantaneous drop compensation. FIG. 2B is the circuit construction for the power failure compensation. For example, FIG. 2A shows the case on the assumption that a backup time is equal to about one second and FIG. 2B shows the case on the assumption that the backup time is equal to about five minutes. The switching power supply 100 is constructed by a full-wave rectifying circuit 201, a power-factor improving circuit (hereinafter, abbreviated to "PFC") 202, and an insulating type DC/DC converter 203. The switching power supply 100 receives an alternating-current (AC) electric power 200 such as commercial power source 100V or 200V, converts it into a direct-current electric power, and outputs it to a load 204. It is now assumed that an output 217 of the PFC is equal to 380V and an output 218 of the DC/DC converter is equal to 12V.

FIG. 2A shows the construction in which the backup unit 2 (105) is connected to the PFC output 217 in the switching power supply. The backup unit 2 (105) is constructed by connecting a plurality of aluminum electrolytic capacitors 106 in parallel. Input/output terminals 205 and 206 are terminals for an input and an output of the backup unit 2 and are connecting interfaces to the switching power supply. The switching power supply is connected to the earth by a ground 207. Ordinarily, since a smoothing capacitor of a high withstanding voltage (not shown) is provided for the PFC output, it is possible to compensate for the instantaneous drop of about a few (msec). However, by enabling a plurality of capacitors to be added as in the embodiment, the instantaneous drop compensation time can be varied by very reasonable method.

FIG. 2B shows the construction in which the backup unit 1 (101) is connected to a bidirectional DC/DC converter 208 in the switching power supply. An electric power can be transmitted and received between the backup unit 1 (101) and a DC/DC converter output 218 through the bidirectional DC/DC converter. The bidirectional DC/DC converter has previously been mounted on the same circuit board together with the PFC and the DC/DC converter or can be also housed in the backup unit 1 (101). In the latter case, a detachable point to/from the switching power supply is an output point of the DC/DC converter. The backup unit 1 (101) is constructed by the secondary battery cell 102 and its state monitoring/control unit 103. As mentioned above, the nickel hydrogen battery, lithium ion battery, or the like having the high energy density can be used as a secondary battery. A plurality of secondary batteries is connected serially or in parallel in accordance with a necessary backup capacity or backup voltage. The battery state monitoring/control unit receives a power failure detection signal 212 which is outputted from the PFC and an analog signal 209 indicative of the voltage, temperature, or the like of the battery and outputs a charge/discharge command signal 213 to the bidirectional DC/DC converter. In this manner, the proper charge/discharge management of the battery is made. The power failure detection signal 212 is inputted to the backup unit 1 through an input terminal 210. The charge/discharge command signal 213 is outputted through an output terminal 211. Input/output terminals 214 and 215 are terminals for an input and an output and are connecting interfaces to the switching power supply which transmits and receives the electric power. The switching power supply is connected to the earth by a ground 216. By performing the backup by using a plurality of secondary batteries as in the embodiment, the backup operation can be executed for a longer time than that in the case of using the capacitors in FIG. 2A. Although the bidirectional DC/DC converter has been connected to the output of the DC/DC converter that is very close to the load in consideration of electric power converting efficiency in the above embodiment, it is also possible to use a construction in which the bidirectional DC/DC converter is connected to the PFC output.

Figure 3:
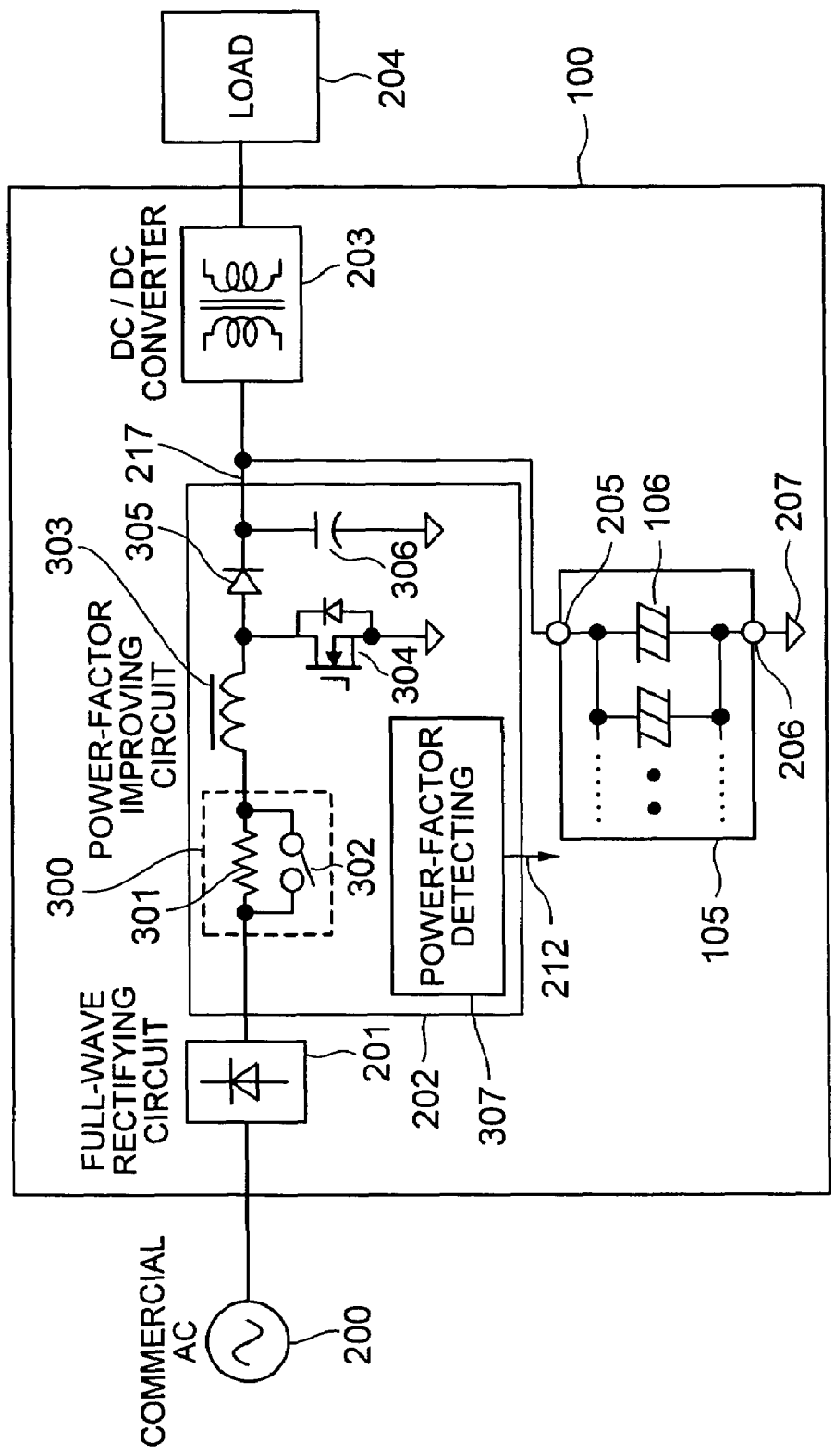
FIG. 3 shows details of the circuit construction of FIG. 2A.

FIG. 3 shows details of the PFC in the circuit construction of FIG. 2A. The PFC is mainly constructed by: a rush current preventing circuit 300 comprising a current limiting resistor 301 and a switch 302; a step-up converter comprising a choke coil 303, a power MOSFET 304, a diode 305, and a smoothing capacitor 306; and a power failure detecting circuit 307.

The rush current preventing circuit is provided to suppress a rush current to the smoothing capacitor at the time of turn-on of the power supply. The current flowing in the smoothing capacitor is suppressed by the current limiting resistor and a terminal voltage of the capacitor gradually rises. When the current decreases to the current which is equal to or less than a predetermined value, the switch is turned on and an impedance of the power line is decreased, thereby reducing an electric power loss. A PTC thermistor can be also used in place of the current limiting resistor. The rush current preventing circuit can be also replaced by the PTC thermistor. A semiconductor switch, an electromagnetic relay, or the like can be used as a switch 302.

The step-up converter controls the power MOSFET so as to widen a conduction angle of the input current while stepping up the PFC output 217 to a voltage (380 DCV) higher than a pulsating voltage of an output of the full-wave rectifying circuit, and suppresses a harmonics current.

The power failure detecting circuit monitors the output voltage of the PFC and outputs the power failure detection signal 212 which is of the high or low level when the voltage is equal to or less than a predetermined value.

In the case where the rush current preventing circuit is built in the PFC as in the embodiment, it is not always necessary to provide the rush current preventing circuit for the backup unit 2 (109) and the foregoing control circuit 2 (109) is unnecessary. At the time of the insertion of the hot line of the backup unit 2, the rush current can be suppressed to a certain extent by the rush current preventing circuit.

The operation of the switching power supply of the embodiment will now be described with reference to FIGS. 4A and 4B. The operation at the time of the instantaneous drop compensation in FIG. 4A will be described. The commercial power source is normal until time t1 and the DC voltage of 380V is outputted as a PFC output. When the instantaneous drop occurs at time t1, the voltage of PFC output gradually decreases. If the voltage drops to a lower limit operation voltage of the DC/DC converter at the post stage, the DC/DC converter cannot output a predetermined voltage for the load, so that a malfunction of the load is caused. Since the commercial power source has been recovered to the normal state at time t2 before the lower limit operation voltage as shown in the diagram, the PFC output voltage is gradually recovered from time t2. A waveform shown by a broken line in the diagram shows a waveform of the voltage when the backup unit 2 has been inserted. A voltage drop ΔV at time t2 is smaller than that before the backup unit 2 is inserted. As will be understood when seeing a cross point with the DC/DC lower limit operation voltage in the case where an extension line of the voltage drop after time t2 is drawn, the instantaneous drop compensation time can be largely extended. The operation at the time of the power failure compensation in FIG. 4B will now be described.

The commercial power source is normal until time t1 and the DC voltage of 380V is outputted as a PFC output. When the power failure occurs at time t1, the voltage of PFC output gradually decreases. At time t2 when the voltage has dropped to a value which is lower than 380V by ΔV, the power failure detection signal 212 (shown as a PG signal in the diagram) is set to the high level and the power failure is detected. At this time, the DC/DC converter output 218 normally outputs 12V because the PFC output voltage at the front stage does not reach the lower limit operation voltage. Since the power failure detection signal becomes the high level, the battery state monitoring/control unit 103 soon executes the internal process and outputs the discharge command signal 213 to the bidirectional DC/DC converter 208 at time t3. The bidirectional DC/DC converter starts to supply a battery electric power to the load 204. When the PFC output reaches the lower limit operation voltage at time t4, the DC/DC converter 203 stops. However, since the energy has been supplied to the load from the bidirectional DC/DC converter, the load can normally continue to operate. When the commercial power source is returned to the normal state for a time interval between t4 and t5, the PFC output voltage rises from 0V. When the voltage is recovered to a recovery detection voltage at time t5, the power failure detection signal 212 is changed again to the low level. Thus, the discharge command signal is set to the low level at time t6 and the bidirectional DC/DC converter halts the operation. Although a battery voltage Vbatt is a constant voltage until the start of the discharge at time t4, the voltage gradually drops from the timing just after the start of the discharge. The battery voltage is equal to Vbatt' at time t6 of the stop of the discharge and a capacity of the charge amount corresponding to such a voltage remains in the battery. The charge command signal 213 is outputted at time t7 in order to set the remaining battery amount to 100%. The battery voltage starts to rise again. A full charge (Vbatt) is detected at time t8 and the charging to the battery is stopped. Although the charge/discharge command signal has been expressed by the same reference numeral (213) for convenience of explanation, it is actually outputted as different signals from the battery state monitoring/control unit.

Figure 5:
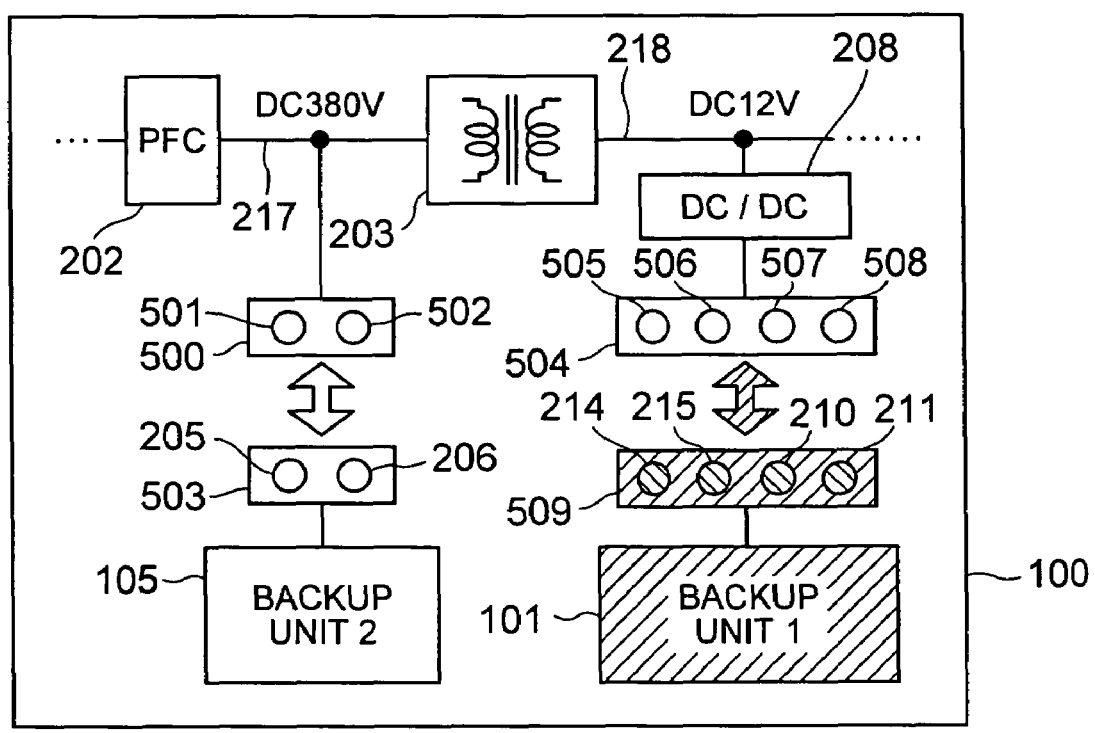
FIG. 5 shows a connecting construction of backup units and a switching power supply in the embodiment of the invention.

FIG. 5 shows an image of connection between the backup units 1 (101) and 2 (105) and the switching power supply in the embodiment. A connector 504 for connection to the backup unit 1 (101) and a connector 500 for connection to the backup unit 2 (105) are provided in the switching power supply. A connector 509 is provided for the backup unit 1 (101). The plus terminal 214 and the minus terminal 215 of the battery, the terminal 210 for the power failure detection signal, and the terminal 211 for the charge/discharge command signal (shown by one terminal for convenience of explanation) are led out to the connectors and are connected to terminals 505, 506, 507, and 508 in the switching power supply by the connectors 504 and 509, respectively. A connector 503 is provided for the backup unit 2 (105). The plus terminal 205 and the minus terminal 206 of the capacitor are led out to the connector and are connected to terminals 501 and 502 in the switching power supply by the connectors 500 and 503, respectively.

According to the embodiment mentioned above, the optimum backup circuit construction according to the backup needs can be formed by the simple method. The miniaturization and low costs of the switching power supply unit having the backup function can be realized. The hot line maintenance and inspection of the backup unit can be performed and the power supply unit of the high reliability can be provided. Further, the switching power supply unit having high additional values which can flexibly cope with the user's needs can be provided.

Figure 6:
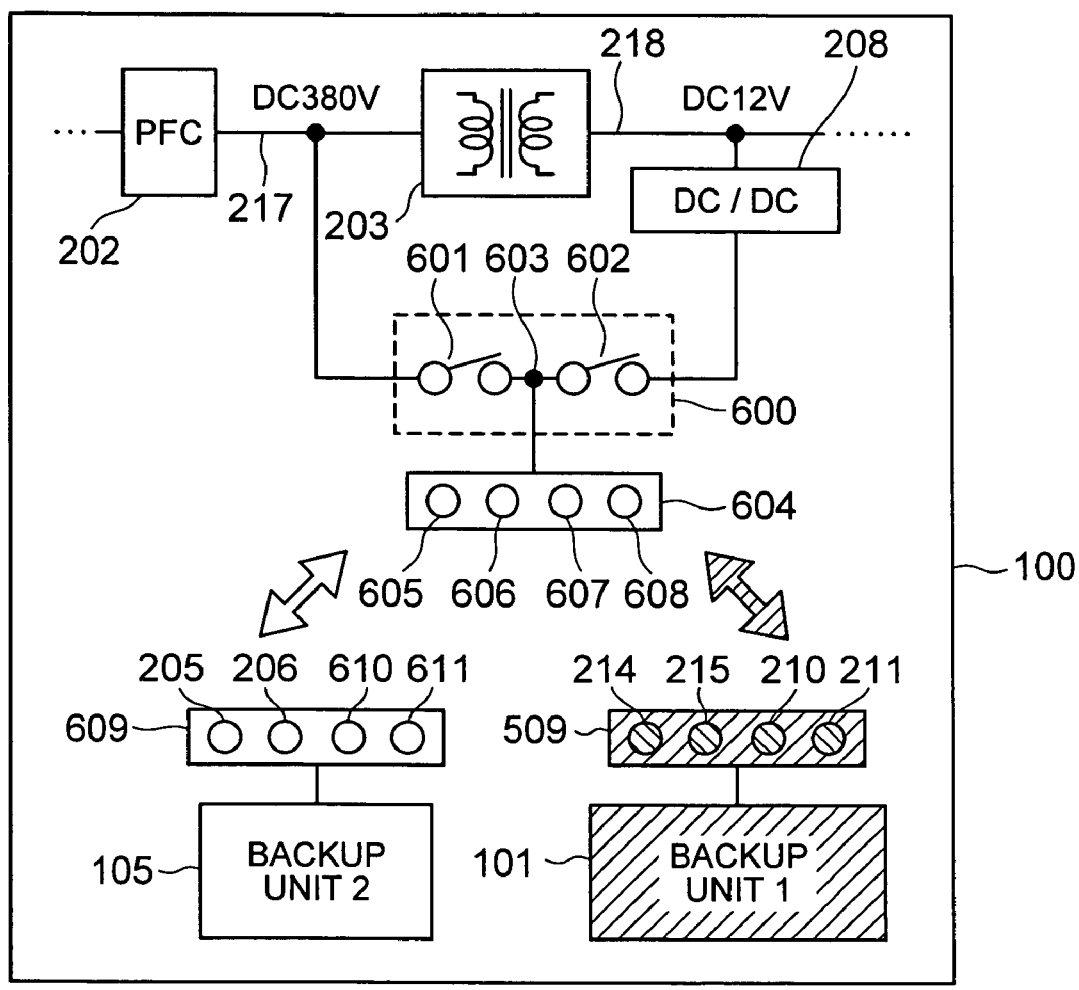
FIG. 6 shows another connecting construction of the backup units and the switching power supply in the embodiment of the invention.

FIG. 6 shows another embodiment of the invention. This diagram shows another form of the connection between the backup units 1 (101) and 2 (105) and the switching power supply. It is a feature of this embodiment that any of the backup units can be connected to a single connector 604 provided in the switching power supply and switching unit 600 which can change a connecting destination in the switching power supply in accordance with each backup unit is provided. The switching unit is constructed by: a switch 602 for connecting the backup unit 1 (101) and the bidirectional DC/DC converter 208 through the connectors 509 and 604; and a switch 601 for connecting the backup unit 2 (105) and the PFC output 217 through connectors 609 and 604. Various kinds of hardware switches may be used as switches 601 and 602 and they can be manually turned on/off. The switches 601 and 602 are connected via a common connection point 603. It is also possible to construct in such a manner that relays or semiconductor switches are used, which one of the backup units has been connected to the connector 604 is separately discriminated, unit for controlling the relays or semiconductor switches is provided, and the on/off operations are automatically executed. The connector 509 is provided for the backup unit 1. The plus terminal 214 and the minus terminal 215 of the battery, the terminal 210 for the power failure detection signal, and the terminal 211 for the charge/discharge command signal (shown by one terminal for convenience of explanation) are led out to the connector and are connected to terminals 605, 606, 607, and 608 in the switching power supply by the connectors 604 and 509, respectively. A circuit construction in which the power source of 12 DCV is backed up by turning off the switch 601 and turning on the switch 602 is formed. The connector 609 is provided for the backup unit 2. The plus terminal 205 and the minus terminal 206 of the capacitor are led out to the connector. Since nothing is electrically connected to terminals 610 and 611, these terminals are empty terminals. The terminals 205, 206, 610, and 611 are connected to the terminals 605, 606, 607, and 608 in the switching power supply by the connectors 604 and 609, respectively. A circuit construction in which the power source of 380 DCV is backed up by turning on the switch 601 and turning off the switch 602 is formed.

According to the embodiment as mentioned above, since it is sufficient to use one connector which is provided for the switching power supply side, the parts costs can be reduced.

Figure 7:
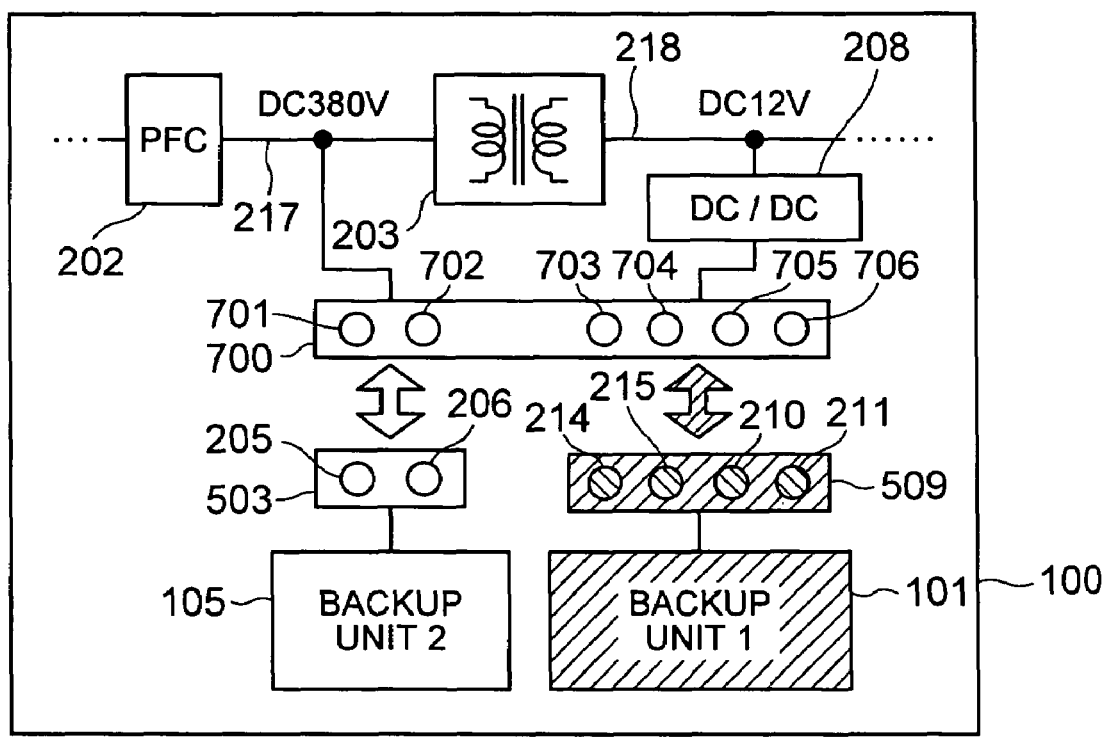
FIG. 7 shows still another connecting construction of the backup units and the switching power supply in the embodiment of the invention.

FIG. 7 shows still another embodiment of the invention. This diagram shows still another form of the connection between the backup units 1 (101) and 2 (105) and the switching power supply described above in FIG. 5. It is a feature of this embodiment that any of the backup units can be connected to a single connector 700 provided in the switching power supply and the foregoing switching unit mentioned in the embodiment of FIG. 6 is not provided. Each of the backup units and the switching power supply can be connected fundamentally in a manner similar to the foregoing embodiments. Terminals 701 and 702 for connecting the PFC output and terminals 703, 704, 705, and 706 for connecting the bidirectional DC/DC converter are led out to the connector 700 which is mounted to the switching power supply. The connector 509 of the backup unit 1 or the connector 503 of the backup unit 2 is connected to the connector 700.

According to the embodiment as mentioned above, since it is sufficient to use one connector which is provided for the switching power supply side and, further, there is no need to use the switching unit as mentioned in the embodiment of FIG. 6, the parts costs can be reduced.

Figure 8:
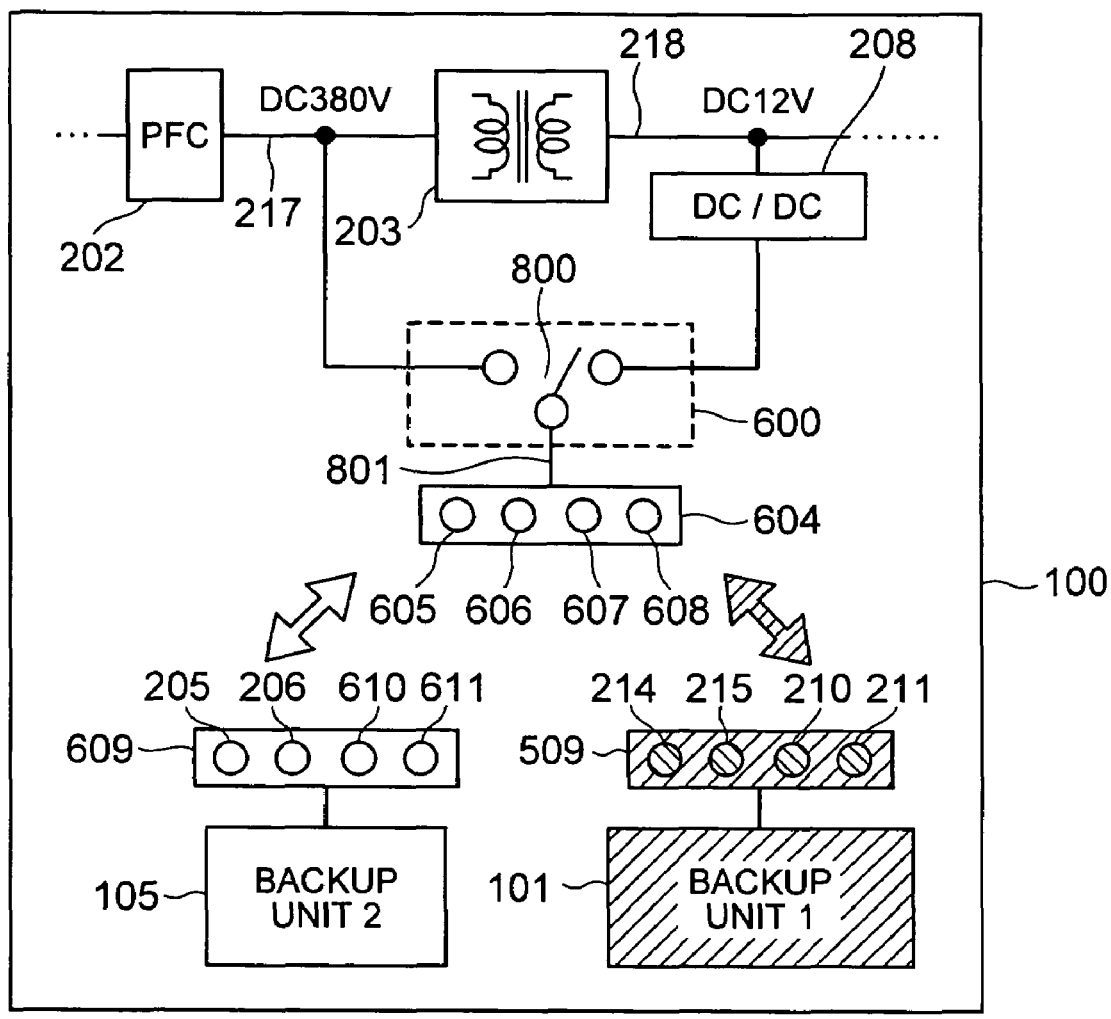
FIG. 8 shows further another connecting construction of the backup units and the switching power supply in the embodiment of the invention.

FIG. 8 shows still another embodiment of the invention. This diagram shows still another form of the connection between the backup units 1 (101) and 2 (105) and the switching power supply described above in FIG. 5. It is a feature of this embodiment that the switching unit 600 mentioned in the embodiment of FIG. 6 is constructed by a single switch 800. The connection between each of the backup units and the switching power supply can be explained in a manner similar to that in the foregoing embodiment of FIG. 6. Any of various kinds of hardware switches can be used as a switch 800 and it is sufficient to manually switch it so as to connect a terminal 801 connected to the connector 604 and the PFC output or connect the terminal 801 and the bidirectional DC/DC converter. It is also possible to construct in such a manner that the relays or semiconductor switches are used, which one of the backup units has been connected to the connector 604 is separately discriminated, the unit for controlling the relays or semiconductor switches is provided, and the switching operations are automatically executed.

According to the embodiment as mentioned above, the switching of the circuit connection in the attaching of one of the backup units to the single connector mounted in the switching power supply can be performed by the single switch and the parts costs can be reduced more than those in the embodiment of FIG. 6.

Figure 9:
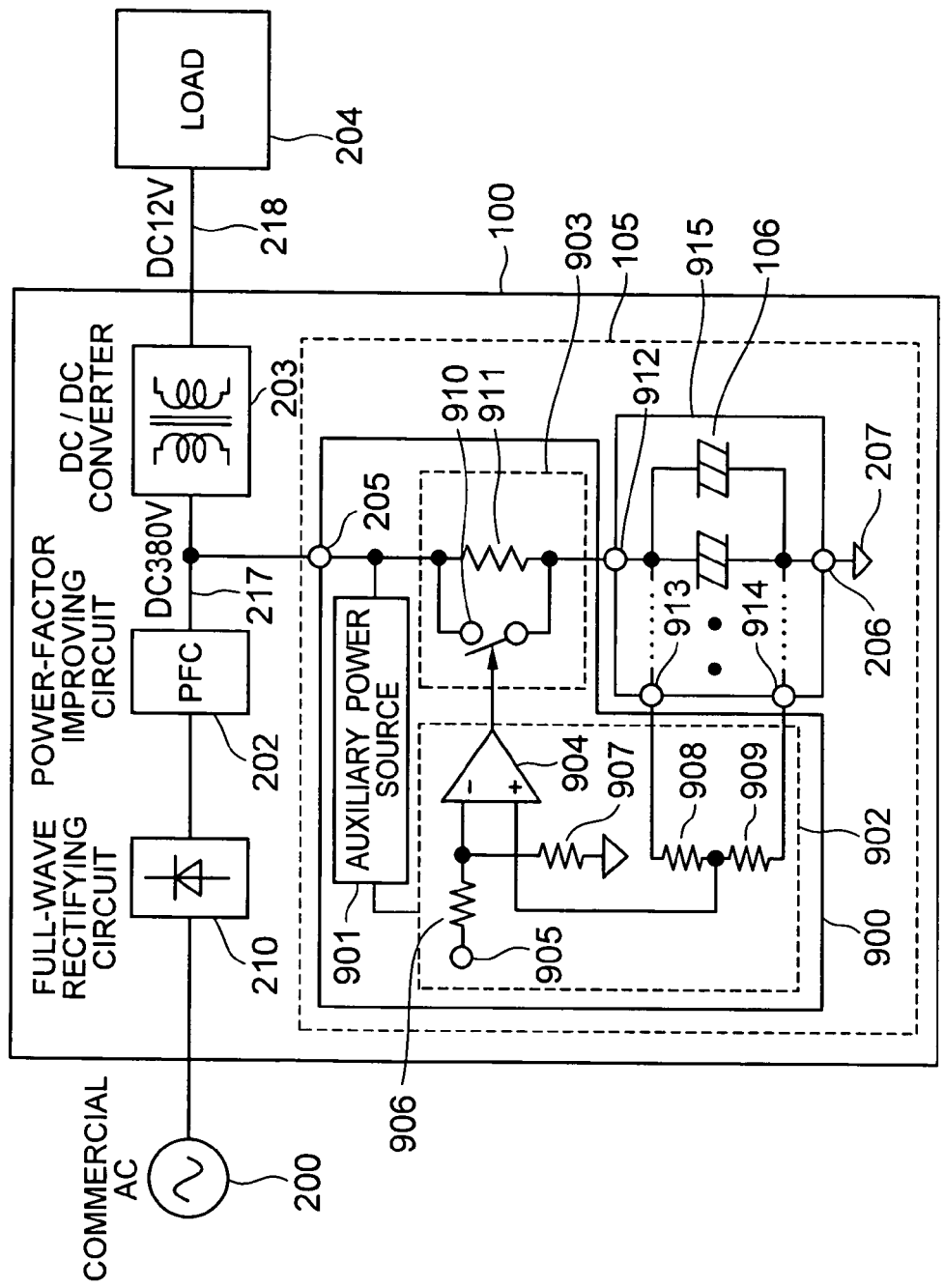
FIG. 9 shows an example of a circuit construction in which a backup unit for compensation for an instantaneous drop in the embodiment of the invention has been attached to the switching power supply.

FIG. 9 shows still another embodiment of the invention. This embodiment shows an example of a circuit construction in the case of attaching the backup unit for instantaneous drop compensation to the switching power supply 100. The backup unit 2 (105) is constructed by rush current suppressing unit 900 and a capacitor unit 915 obtained by connecting a plurality of capacitors 106 in parallel. When comparing with FIG. 1, the control circuit 2 (109) corresponds to the rush current suppressing unit 900 and the backup unit 2 (105) corresponds to the backup unit 2 (105). The rush current suppressing unit is constructed by an auxiliary power source 901, a rush current control circuit 902, and a rush current preventing circuit 903. The rush current control circuit is constructed by a reference voltage 905, voltage dividing resistors 906 and 907, voltage dividing resistors 908 and 909 connected between terminals of the capacitor, and a comparator 904. When the auxiliary power source is connected through interfaces for connecting the switching power supply of the backup units 1 (101) and 2 (105), it supplies a power voltage of the comparator and the reference voltage to the rush current control circuit. At first, since no charges are accumulated in the capacitor unit, the terminal voltage of the capacitor is equal to 0 and the comparator outputs an OFF signal of a switch 910 of the rush current preventing circuit. The rush current to the capacitor unit is suppressed by a current limiting resistor 911. The terminal voltage of the capacitor gradually rises. When it reaches a predetermined value, the output of the comparator is inverted and an ON signal of the switch 910 is outputted. Thus, the impedance of the power line between the capacitor unit and 380 DCV is decreased, thereby reducing the electric power loss. The rush current preventing circuit can be also constructed by using the PTC thermistor as mentioned in the embodiment of FIG. 1. Terminals 912, 913, and 914 are connecting interfaces of the rush current suppressing unit and the capacitor unit and both of them are detachably constructed through the connecting interfaces.

The embodiment can be applied to the case where the rush current preventing circuit is built in the PFC as mentioned in the embodiment of FIG. 1 and the case where it is not built in. Since the embodiment uses the construction in which a plurality of capacitors for expansion compensation are connected to the output smoothing capacitor in the PFC through the rush current preventing circuit, the hot line can be easily inserted and pulled out and the high reliability can be obtained.

Figure 10:
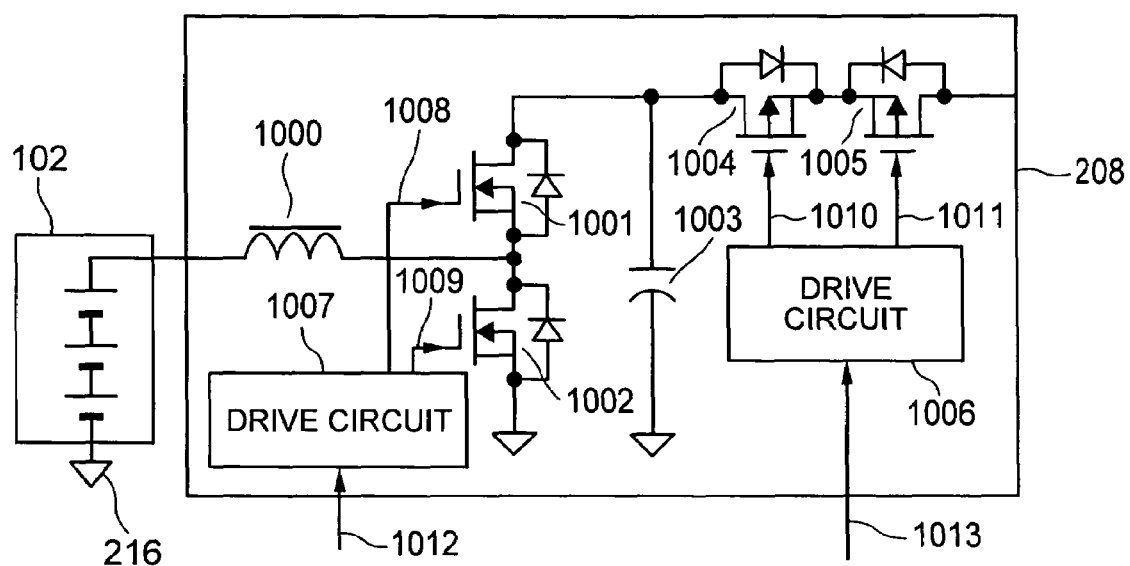
FIG. 10 shows an example of a construction of a DC/DC converter in a circuit construction for compensation for a power failure in FIG. 2B.

FIG. 10 shows still another embodiment of the invention. This embodiment shows an example of a construction of the bidirectional DC/DC converter 208 in the circuit construction for power failure compensation in FIG. 2B. The bidirectional DC/DC converter 208 is constructed by: a bidirectional chopper circuit comprising a choke coil 1000, n-channel type power MOSFETs 1001 and 1002, and a smoothing capacitor 1003; semiconductor switches 1004 and 1005; and drive circuits 1006 and 1007. p-channel type power MOSFETs are used as semiconductor switches and their source electrodes are connected in common, thereby making it possible to prevent the rush currents from entering both of the secondary battery cell 102 and the DC/DC converter 203 output.

Explanation will be made on the assumption that the battery voltage is lower than the output voltage of the DC/DC converter 203. The discharge from the battery is executed by switching and PWM-controlling the power MOSFET 1002 by a drive signal 1009 from the drive circuit 1007 based on a control signal 1012, and the energy accumulated in the coil is supplied while keeping the DC/DC converter output at a predetermined voltage. The charge into the battery is executed by switching and PWM-controlling the power MOSFET 1001 by a drive signal 1008 from the drive circuit 1007. The charge or discharge command signal is inputted to the drive circuit 1007 by the battery state monitoring/control unit.

Upon insertion of the hot line of the backup unit 1, for example, the above discharging operation is executed while keeping the OFF state of the semiconductor switches 1004 and 1005, and the semiconductor switches 1004 and 1005 are turned on in the state where the voltage of the smoothing capacitor 1003 has been raised to a value near the output voltage of the DC/DC converter 203. By this method, the rush current from the DC/DC converter to the bidirectional DC/DC converter can be suppressed. To pull out the hot line, it is sufficient to remove the backup unit 1 in the OFF state of the semiconductor switches 1004 and 1005. By controlling the switches 1004 and 1005 through the drive circuit 1006 by a hot line insertion/pull-out control signal 1013 from the battery state monitoring/control unit as mentioned above, the insertion and pull-out of the hot line of the backup unit can be performed.

Figure 11:
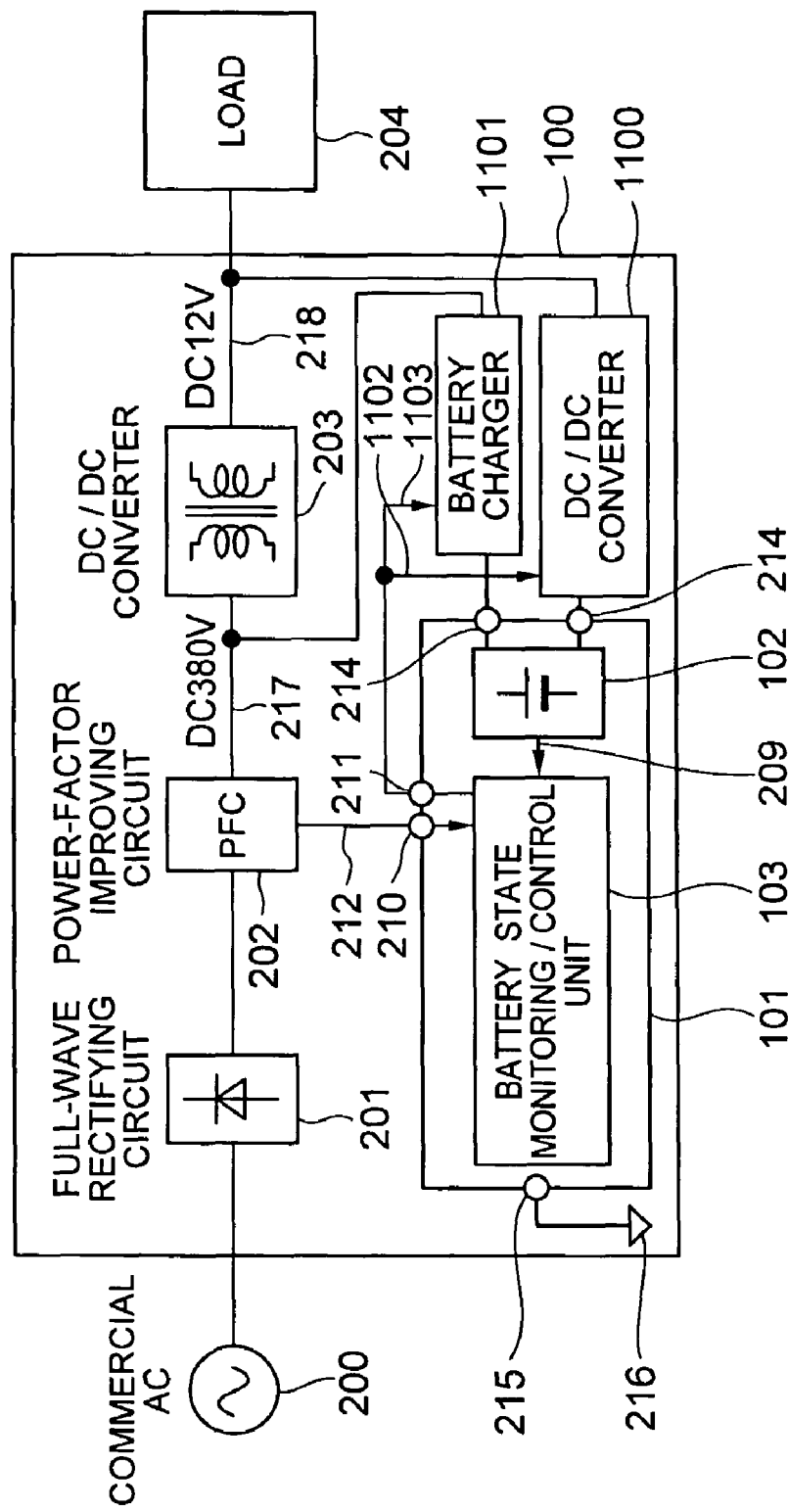
FIG. 11 shows another embodiment of the circuit construction of FIG. 2B.

FIG. 11 shows still another embodiment of the invention. This embodiment shows a construction in which the charge and discharge of the secondary battery cell 102 can be performed by different routes in the circuit construction for power failure compensation in FIG. 2B. The discharge from the battery to the load 204 is executed by a DC/DC converter 1100. The charge to the battery is executed by the PFC output 217 through a battery charger 1101. A discharge command signal. 1102 and a charge command signal 1103 are transmitted from the battery state monitoring/control unit through the output terminal 211.

The above embodiment is effective, for example, in the case where it is difficult to design the DC/DC converter 203 in consideration of the charge current amount to the battery. There is a case where the costs can be reduced more by performing the charge and discharge by the different routes in dependence on the specifications of the voltage or capacity to be backed up, a charge current rate, and the like.

Figure 12:
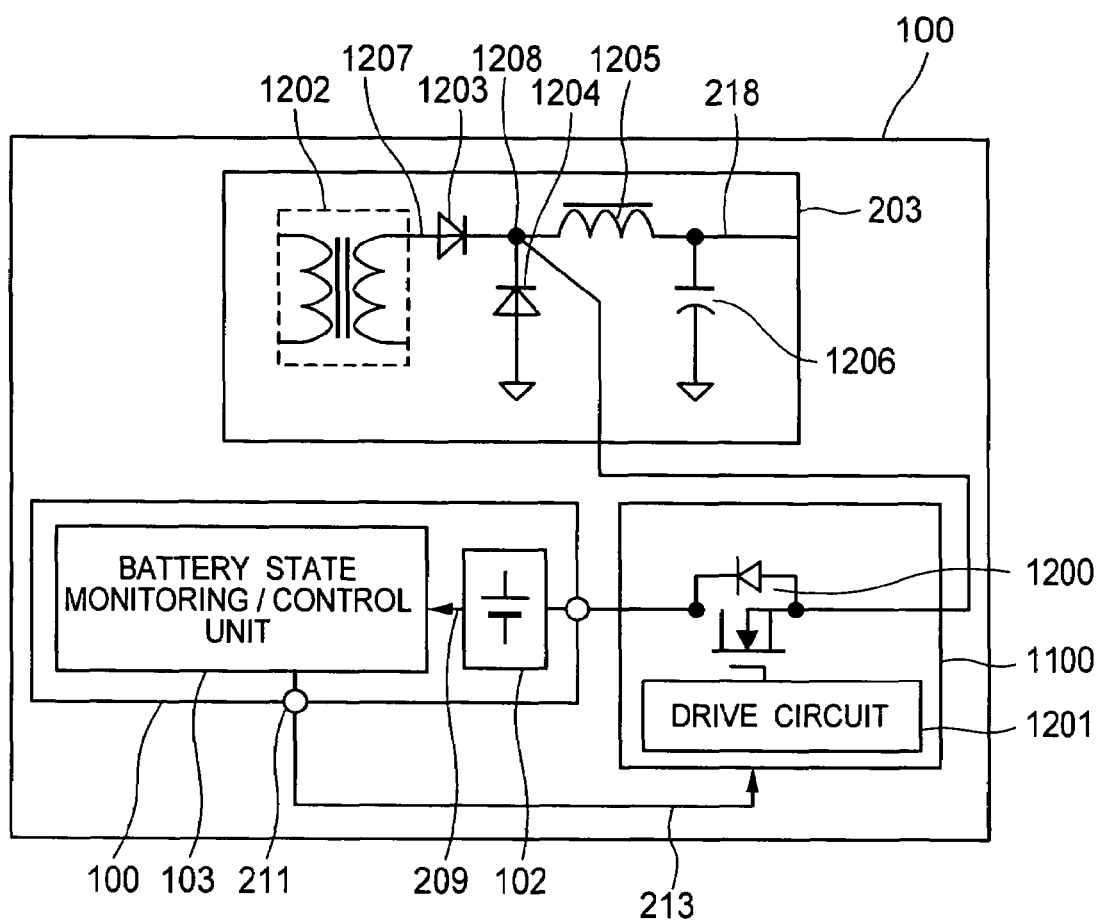
FIG. 12 shows another embodiment of the circuit construction of FIG. 11.

FIG. 12 shows still another embodiment of the invention. This embodiment shows an example of a construction of the DC/DC converter 1100 mentioned in the above embodiment of FIG. 11, and a connecting destination of an output of the DC/DC converter 1100, that is, a backup point is changed. A detailed circuit construction of the secondary side of the insulating type DC/DC converter 203, the backup unit 1 (101), and the DC/DC converter 1100 are shown. The insulating type DC/DC converter 203 is constructed by a transformer 1202, diodes 1203 and 1204, a choke coil 1205, and a smoothing capacitor 1206. The transformer 1202 is connected to an anode of the diode 1203 via an output line 1207 of the transformer 1202. The DC/DC converter 1100 is constructed by an n-channel type power MOSFET 1200 and a drive circuit 1201. The DC/DC converter 1100 is connected between the secondary battery cell 102 and a common cathode side 1208 of both diodes.

Explanation will now be made on the assumption that the battery voltage is higher than the output voltage of the DC/DC converter 203. When the discharge command signal 213 is outputted from the battery state monitoring/control unit 103, the power MOSFET 1200 which is ordinarily OFF is switching and PWM-controlled by the drive circuit 1201. The energy which is accumulated in the choke coil 1205 is supplied to the load and control is made so that the output voltage becomes constant.

In the embodiment, a step-down converter circuit is formed by the devices such as power MOSFET 1200, diode 1204, choke coil 1205, and smoothing capacitor 1206 at the time of the power failure. The devices which operate as a secondary side circuit of the insulating type DC/DC converter 203 in the normal state are used in common even at the time of the power failure, thereby minimizing the number of parts of the DC/DC converter 1100 and enabling the miniaturization and low costs of the switching power supply unit to be realized. The power MOSFET 1200 also plays a role of the switch for hot line insertion and pull-out. Together with the battery charger (not shown), the backup unit is constructed so that the hot line can be inserted and pulled-out.

Figure 13:
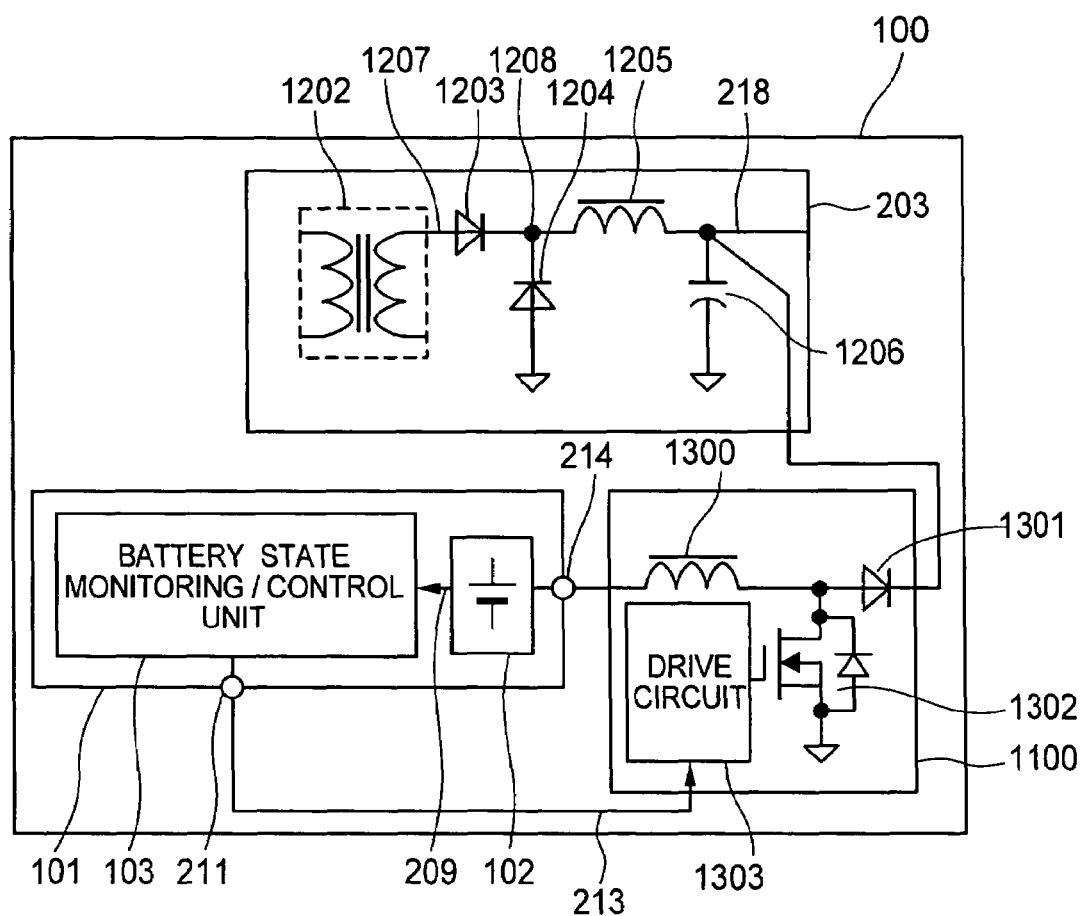
FIG. 13 shows another embodiment of the DC/DC converter in FIG. 12.

FIG. 13 shows still another embodiment of the invention. This embodiment shows an example of a construction of the DC/DC converter 1100 in a manner similar to the above embodiment of FIG. 12. The connecting destination of the output of the DC/DC converter 1100 is held to the output 218 of the insulating type DC/DC converter 203. Explanation of the overlapped portions with those in the foregoing embodiment of FIG. 12 is omitted. The DC/DC converter 1100 is constructed by a choke coil 1300, a diode 1301, an n-channel type power MOSFET 1302, and a drive circuit 1303.

Explanation will now be made on the assumption that the battery voltage is lower than the output voltage of the DC/DC converter 203. When the discharge command signal 213 is outputted from the battery state monitoring/control unit 103, the power MOSFET 1302 which is ordinarily OFF is switching and PWM-controlled by the drive circuit 1303. The energy accumulated in the choke coil 1300 is supplied to the load and control is made so that the output voltage becomes constant.

In the embodiment, a step-up converter circuit is formed by the devices such as choke coil 1300, diode 1301, n-channel type power MOSFET 1302, and smoothing capacitor 1206 at the time of the power failure.

The smoothing capacitor 1206 as a part of the secondary side circuit of the insulating type DC/DC converter 203 in the normal state is also used in common even at the time of the power failure, thereby minimizing the number of parts of the DC/DC converter 1100 and enabling the miniaturization and low costs of the switching power supply unit to be realized. The diode 1301 also plays a role of the switch for hot line insertion and pull-out. Together with the battery charger (not shown), the backup unit is constructed so that the hot line can be inserted and pulled-out.

Figure 14:
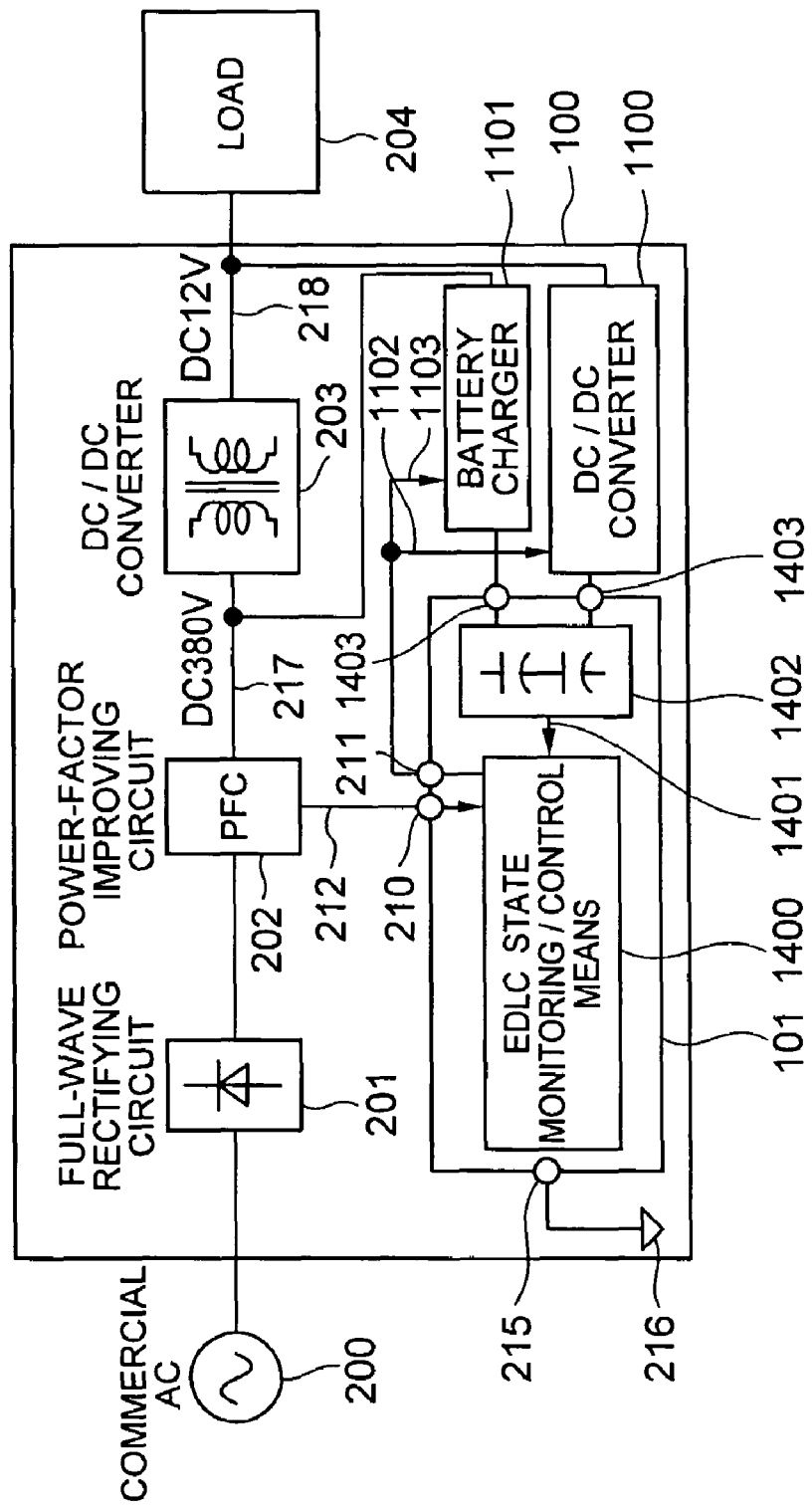
FIG. 14 shows another embodiment of the circuit construction of FIG. 11.

FIG. 14 shows still another embodiment of the invention. This embodiment shows an example of a construction of the backup unit 1 (101) in the circuit construction for power failure compensation in FIG. 11 mentioned above. Explanation of the overlapped portions with those in the foregoing embodiment of FIG. 11 is omitted.

The backup unit 1 (101) is constructed by: an EDLC unit 1402 formed by serially connecting a plurality of cells of the electric double layer capacitors (EDLCs); and EDLC state monitoring/control unit 1400. The EDLC state monitoring/control unit 1400 executes a process for balancing the voltages among the EDLCs while monitoring the voltages among the plurality of cells of the EDLCs which are serially connect. Such a balancing process is executed in response to an interface signal 1401 between the EDLC state monitoring/control unit 1400 and the EDLC unit 1402. The EDLC state monitoring/control unit 1400 also controls the battery charger 1101 so that a charge amount of the EDLC is set to a proper value. If the power failure is detected by the PFC output signal 212, the EDLC state monitoring/control unit 1400 immediately outputs a discharge command to the DC/DC converter 1100. The DC/DC converter 1100 supplies the energy accumulated in the EDLC to the load. An interface between the switching power supply 100 and the backup unit 1 (101) corresponds to a plus terminal 1403 of the EDLC, the minus terminal 215, the terminal 210 for the power failure detection signal, and the terminal 211 for the charge/discharge command signal (shown by one terminal for convenience of explanation).

According to the foregoing embodiment, since the EDLC is used as an energy source, the discharge current rate is extremely higher than that of the battery. The embodiment is effective in the case where it is necessary to back up a relatively low voltage, a large current is necessary, and the specifications cannot be satisfied at the discharge current rate of the battery which is used.

Naturally, the other embodiments as mentioned above (the installation and connecting form of the switching power supply connector and the backup unit connector, constructional example of the DC/DC converter 1100, and the like) can be also applied to the present embodiment.

Figure 15:
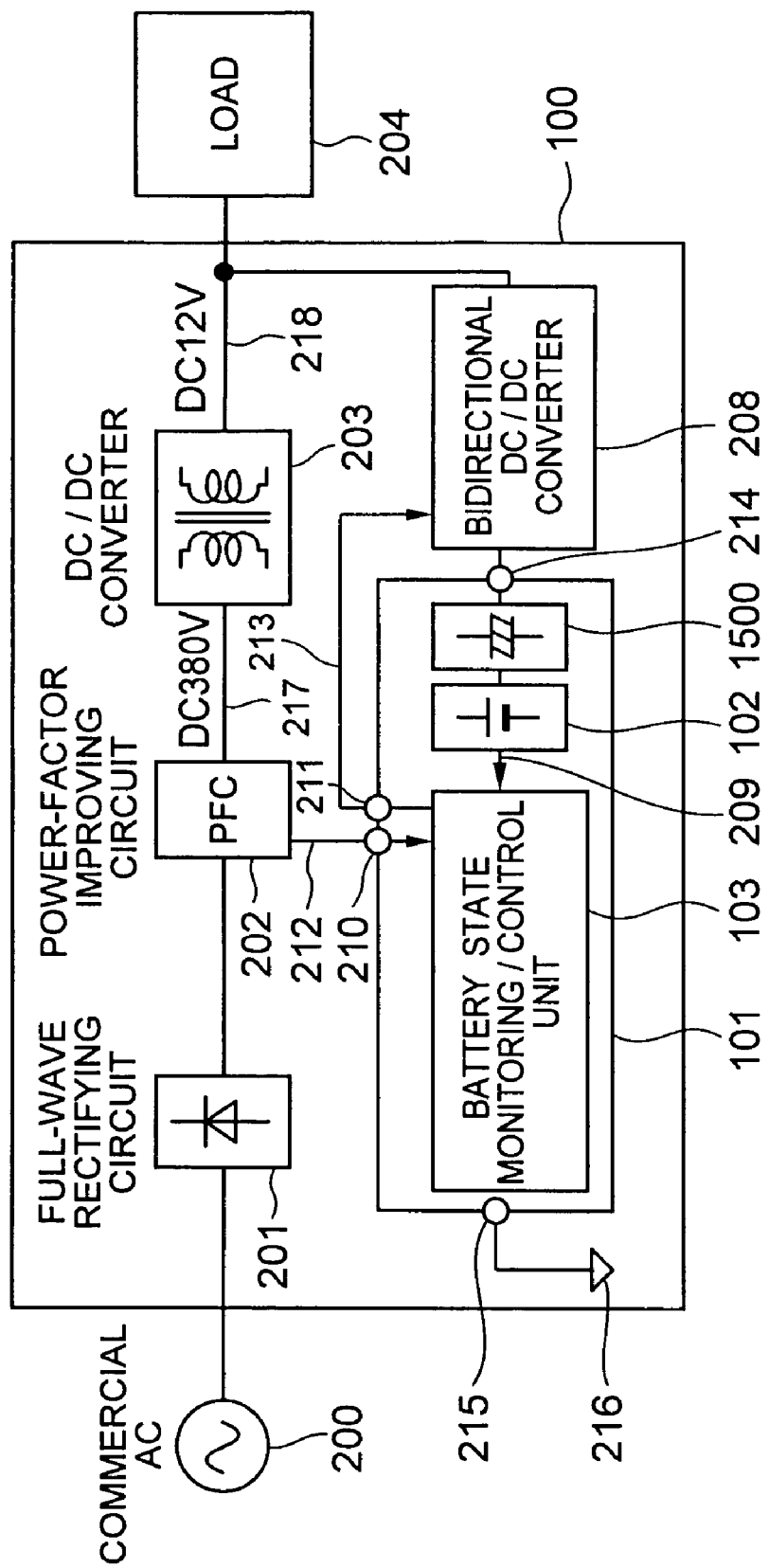
FIG. 15 shows another embodiment of the circuit construction of FIG. 2B.

FIG. 15 shows still another embodiment of the invention. This embodiment shows an example of a construction of the backup unit 1 (101) in the circuit construction for power failure compensation in FIG. 2B mentioned above. Explanation of the overlapped portions with those in the foregoing embodiment of FIG. 1 is omitted.

It is a feature of this embodiment that an electrolytic capacitor 1500 is connected to the secondary battery cell 102 in parallel in the backup unit 1 (101). A case of using the EDLCs besides the electrolytic capacitor is also considered. In the case of using the EDLCs, it is necessary to adjust the number of EDLCs which are serially connected or the number of batteries which are serially connected. If the EDLCs are serially connected and used, as mentioned in the above embodiment of FIG. 14, it is necessary to monitor the voltages and execute the process for balancing the voltages among the EDLCs. In such a case, the control of the EDLCs is also made by the battery state monitoring/control unit 103.

Figure 16:
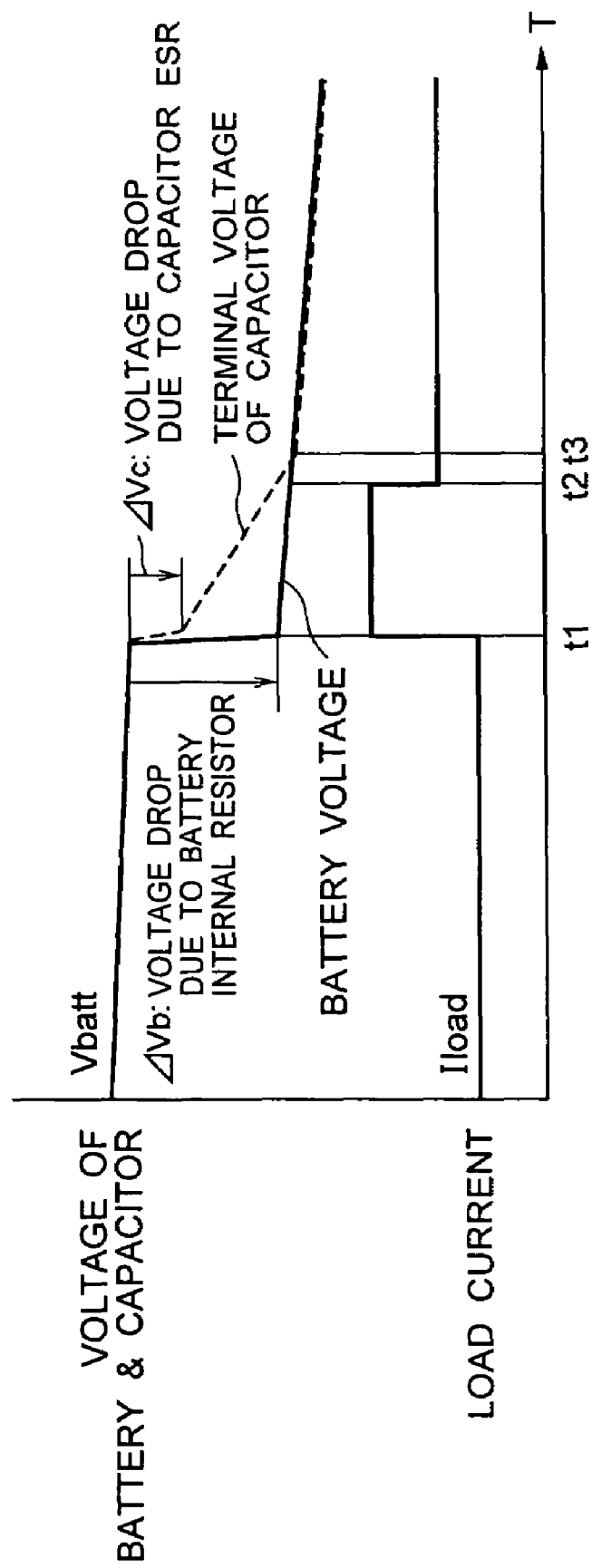
FIG. 16 is a diagram explaining the operation of another embodiment of the invention.

The operation during the backup of the embodiment will be described with reference to FIG. 16. The bidirectional DC/DC converter 208 executes the discharging operation and supplies the energy in the battery and the capacitor to the load. A load current Iload is constant and is a relatively small current until time t1. When Iload suddenly changes at time t1, the voltage Vbatt of the battery and the capacitor which has gently been being dropped so far suddenly drops. An amount of voltage drop of the battery and that of the capacitor are different. Generally, a voltage drop ΔVb due to a battery internal resistor is larger than a voltage drop amount ΔVc due to a capacitor ESR. Since the capacitor voltage is higher until time t2, the energy in the capacitor is supplied to the load. Therefore, the terminal voltage of the capacitor decreases at a certain inclination. At time t3 when the capacitor terminal voltage and the battery voltage are equal, an inclination of the drop of the capacitor terminal voltage is equalized to that of the battery voltage drop. Since an amount of current (discharge current) which can be extracted from the battery is smaller than that from the capacitor, there is a case where the energy cannot be supplied from the battery in response to the sudden current change. Therefore, if a large current is necessary only for a very short time, it is more desirable to use the capacitor. However, since an energy density of the battery is high, the battery is more excellent than the capacitor in the case of the backup for a long time.

By combining the battery and the capacitor and using them as an energy source as mentioned above, an applying range of the embodiment can be widened and the reliability for the load can be improved.

Naturally, the other embodiments as mentioned above (the installation and connecting form of the switching power supply connector and the backup unit connector, the constructional example of the bidirectional DC/DC converter 208, the construction in which the battery charger is separately provided and the charge and discharge are performed by different routes, and the like) can be also applied to the present embodiment.

Figure 17:
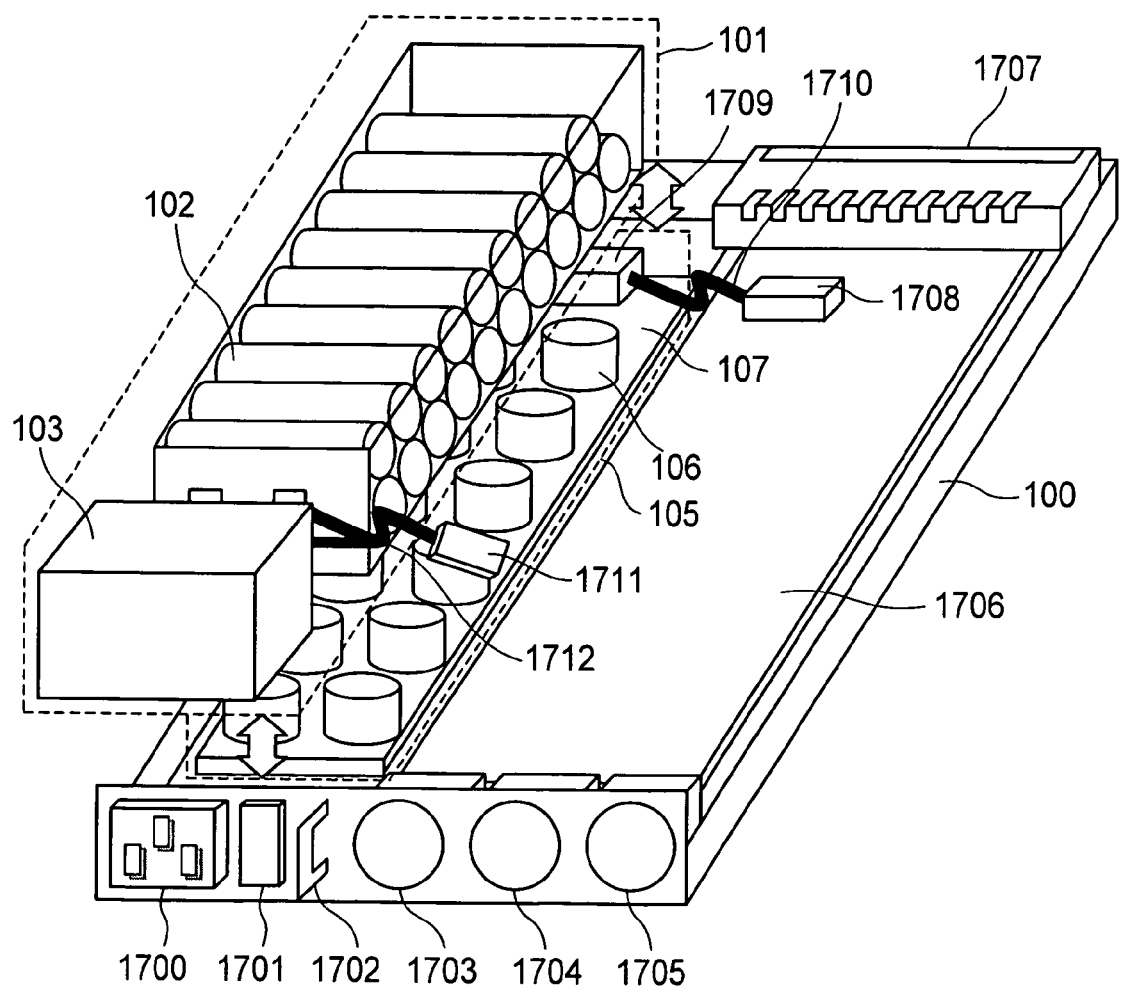
FIG. 17 shows another embodiment of the invention.

FIG. 17 shows still another embodiment of the invention. This embodiment shows an example of a construction in the case where the backup unit 1 (101) and the backup unit 2 (105) have been mounted in the switching power supply unit 100 with the backup function. Although the structure in which the backup unit can be pulled out from the front side of the switching power supply in FIG. 1, in the present embodiment, there is used a structure in which an upper lid of a casing of the switching power supply is removed and the backup unit is mounted into an enclosing space. Although not shown, there is also a structure in which the backup unit can be pulled out from a rear portion of the casing of the switching power supply or a structure in which the backup unit can be pulled out from a side surface of the backup unit side. A fundamental construction of each of those structures is almost the same as that in FIG. 1 and explanation of the overlapped portions is omitted.

The power supply unit is constructed by: an AC connector 1700; a switch 1701; a handle 1702; fans 1703, 1704, and 1705; a printed circuit board 1706; a connector 1707; and a connector 1708 for connecting the backup unit via a connector 1709. Various kinds of parts constructing the PFC, the insulating type DC/DC converter, and the like are mounted on the printed circuit board. The diagram illustrates the state where a cable 1710 pulled out of the rear portion of the backup unit 2 and a connector (not shown) are connected to the connector 1708 on the printed circuit board of the switching power supply. A cable 1712 and a connector 1711 are pulled out of the front portion of the backup unit 1. When the backup unit 1 is connected to the switching power supply, the backup unit 2 is removed and the connectors 1708 and 1711 are connected.

By eliminating the backup unit pull-out enclosing portion of the front surface of the casing of the switching power supply as in the embodiment, a fan can be added and a cooling effect in of the switching power supply is enhanced. In the case of controlling a rotational speed of the fan, since the number of fans is increased, an air volume in the switching power supply casing can be more finely adjusted. Therefore, temperature control of the battery can be made in a wide range and the switching power supply unit with the backup function which can more flexibly cope with the ambient environment can be provided.

Figure 18:
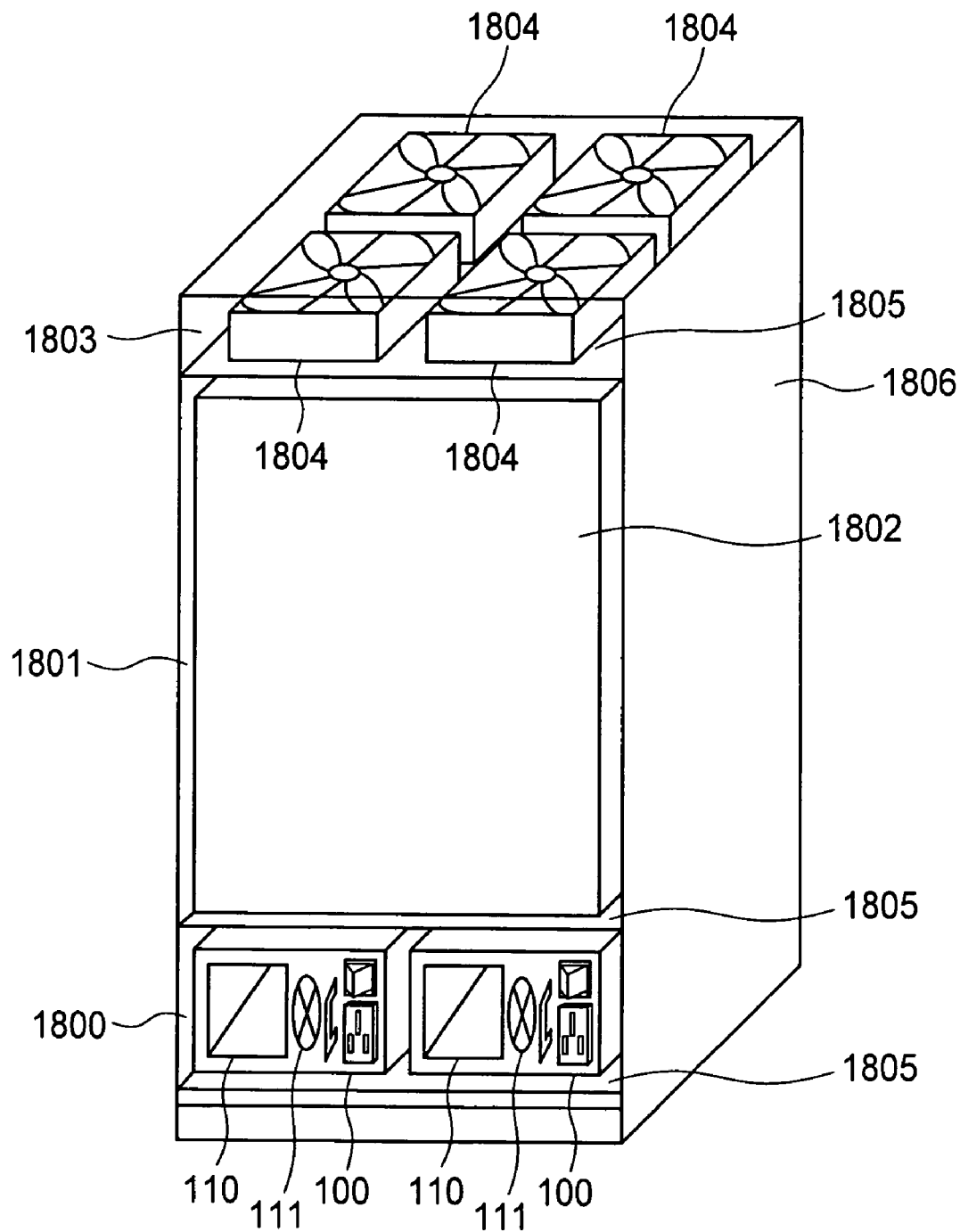
FIG. 18 shows an embodiment in which the invention is applied to a disk array system.

FIG. 18 shows still another embodiment of the invention. This embodiment shows an example in which the foregoing switching power supply unit with the backup function is applied to a disk array system. The disk array system 1806 is constructed by a disk apparatus unit 1802, a fan 1804, and the switching power supply 100. The disk apparatus unit 1802 is constructed by: a disk array unit in which a plurality of hard disks is arranged; a disk array control unit comprising a cache memory, a CPU, and the like. The disk array system also has a power supply enclosing portion 1800, a disk apparatus unit enclosing portion 1801, and a fan enclosing portion 1803. The disk array system further has a partition member 1805 to partition the enclosing portions. The embodiment as shown in each of FIGS. 1 to 17 mentioned above can be applied to the switching power supply 100. A plurality of switching power supplies 100 are installed in a bottom portion of the disk array system by arranging them into a space within the minimum height 1 U (44 mm) or the minimum height unit (1 U, 2 U, 3 U, . . . ) of a rack. The switching power supplies are connected into the disk array system (not shown) by a back board or connector. Further, the switching power supplies are constructed so that the hot lines can be inserted and pulled out.

Although the structure in which the hot line of the backup unit can be inserted and pulled out into/from the switching power supply casing is shown in the diagram, even in the case of using the switching power supply of the embodiment shown in FIG. 17, by inserting and pulling out the hot line of the switching power supply and, thereafter, attaching and detaching the backup unit into/from the switching power supply casing, the hot line of the backup unit can be indirectly inserted and pulled out.

By the embodiment as mentioned above, the disk array system with the high reliability can be provided.

As described above, according to the invention, it is possible to realize the small and low-cost switching power supply unit with the backup function in which the proper circuit construction can be selected by the simple method when it is necessary to compensate for the instantaneous drop or power failure.

Further, according to the invention, the disk array system having the small and low-cost switching power supply system with the backup function can be also provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A switching power supply unit which has a charge accumulating unit and can supply an electric power to a load in case of emergency, wherein:
   an electric power converting circuit and a state monitoring and control unit having a state monitoring unit of the charge accumulating unit and a control unit for controlling the electric power converting circuit, are connected to the charge accumulating unit;
   the electric power converting circuit is connected to a direct-current line in the switching power supply unit so that a charge and a discharge of the charge accumulating unit can be performed; and
   a first backup unit of a first energy type bank for power failure compensation having the charge accumulating unit and the state monitoring and control unit therein and a second backup unit of a second energy type bank for an instantaneous drop compensation having the charge accumulating unit and the state monitoring and control unit therein, are configured to be replaced with each other and to be detachably provided in the same insertion slot of a casing of the switching power supply unit; and
   wherein the first back up unit of the energy bank for power failure compensation and the second back up unit of the energy bank for instantaneous drop compensation are connected to direct-current lines of different electric potentials in the switching power supply unit through a connector in the switching power supply unit.

2. The unit according to claim 1, wherein the first and the second back up units can insert and pull out a hot line into/from the casing of the switching power supply unit.

3. The unit according to claim 1, wherein the charge accumulating unit of the first back up unit of the first energy type bank for power failure compensation is constructed by a nickel-metal hydrogen or lithium ion secondary battery.

4. The unit according to claim 1, wherein the charge accumulating unit of the second back up unit of the second energy type bank for instantaneous drop compensation is constructed by an aluminum electrolytic capacitor or an electric double layer capacitor.

5. The unit according to claim 1, wherein the electric power converting circuit is detachably provided in the switching power supply unit casing in a manner similar to the first and the second back up units, and its hot line can be inserted and pulled out into/from the switching power supply unit casing together with the backup unit.

6. A switching power supply unit which has a charge accumulating unit and supplies an electric power to a load in case of emergency, wherein
   a state monitoring and control unit having a state monitoring unit of the charge accumulating unit and a control unit for controlling the electric power converting circuit is connected to an electric power converting circuit and the charge accumulating unit; and
   a first backup unit having a secondary battery and a state monitoring and control unit of the secondary battery therein, and a second backup unit having a capacitor and a state monitoring and control unit of the capacitor therein, is detachably provided in the same insertion slot of a casing of the switching power supply unit;
   wherein the first and the second backup units are connected to direct-current lines of a different electric potentials in the switching power supply unit through a connector in the switching power supply unit.

7. The unit according to claim 6, wherein the first backup unit or the second backup unit can insert and pull out hot lines into/from the connector in the casing of the switching power supply unit.

8. A disk array system having a switching power supply unit which has a charge accumulating unit and supplies an electric power to a load in case of emergency, wherein:
   an electric power converting circuit and a state monitoring and control unit having a state monitoring unit of the charge accumulating unit and a control unit for controlling the electric power converting circuit, are connected to the charge accumulating unit;
   the electric power converting circuit is connected to a direct-current line in the switching power supply unit so that a charge and a discharge of the charge accumulating unit can be performed; and
   a first backup unit of a first energy type bank for power failure compensation having the charge accumulating unit and the state monitoring and control unit therein and a second back up unit of a second energy type bank for an instantaneous drop compensation having the charge accumulating unit and the state monitoring and control unit therein, are configured to be replaced with each other and to be detachably provided in the same insertion slot of a casing of the switching power supply unit, and
   wherein the first back up unit of the energy bank for power failure compensation and the second back up unit of the energy bank for instantaneous drop compensation are connected to direct-current lines of different electric potentials in the switching power supply unit through a connector in the switching power supply unit, and wherein
   said switching power supply unit is arranged in a rack casing of said disk array system, and
   said switching power supply unit can insert and pull out a hot line into/from said disk array system.

9. A system according to claim 8, wherein a plurality of the switching power supply units are arranged in a lower portion of the rack casing of the disk array system.

10. A disk array system which has charge accumulating unit and can supply an electric power through a switch power supply unit to a load in case of emergency, wherein
    a state monitoring and control unit having a state monitoring unit of the charge accumulating unit and a control unit for controlling the electric power converting circuit, is connected to an electric power converting circuit and the charge accumulating unit; and
    a first backup unit having a secondary battery and a state monitoring and control unit of the secondary battery therein, and a second backup unit having a capacitor and a state monitoring and control unit of the capacitor therein, is detachably provided in the same insertion slot of a casing of the switching power supply unit;
    wherein the first and the second backup units are connected to direct-current lines of a different electric potentials in the switching power supply unit through a connector in the switching power supply unit.

11. The system according to claim 10, wherein the first and the second backup units can insert and pull out hot lines into/from the disk array system.

12. The unit according to claim 1, wherein the electric power converting circuit is connected to an input or an output of a secondary rectifying circuit in the switching power supply unit for backup by discharging from the charge accumulating unit.

\* \* \* \* \*